(12) United States Patent
Spivak

(10) Patent No.: US 10,067,154 B2
(45) Date of Patent: Sep. 4, 2018

(54) ACCELEROMETER WITH INDUCTIVE PICK-OFF

(71) Applicant: Honeywell International Inc., Morristown, NJ (US)

(72) Inventor: Alexander Spivak, Sammamish, WA (US)

(73) Assignee: Honeywell International Inc., Morris Plains, NJ (US)

( * ) Notice: Subject to any disclaimer, the term of this patent is extended or adjusted under 35 U.S.C. 154(b) by 458 days.

(21) Appl. No.: 14/809,006

(22) Filed: Jul. 24, 2015

(65) Prior Publication Data

US 2017/0023605 A1    Jan. 26, 2017

(51) Int. Cl.
    *G01P 15/11*    (2006.01)
    *G01P 15/18*    (2013.01)
    *G01P 15/08*    (2006.01)

(52) U.S. Cl.
    CPC .......... *G01P 15/11* (2013.01); *G01P 15/0802* (2013.01); *G01P 15/18* (2013.01); *G01P 2015/082* (2013.01)

(58) Field of Classification Search
    CPC ........ G01P 15/00; G01P 15/032; G01P 15/08; G01P 15/0802; G01P 2015/0862; G01P 15/11; G01P 2015/082; G01P 2015/0865; G01P 15/0885; G01P 15/105; B81B 7/008; B81B 2201/025
    USPC .............................................. 73/514.31, 779
    See application file for complete search history.

(56) References Cited

U.S. PATENT DOCUMENTS

| 3,636,752 A |   | 1/1972 | Ishii |
| 3,671,904 A | * | 6/1972 | Tribken .................. H01F 29/10 336/132 |
| 3,691,850 A | * | 9/1972 | Slater .................... G01P 15/132 73/514.06 |
| 4,169,384 A |   | 10/1979 | Flanner et al. |
| 4,364,045 A |   | 12/1982 | Spiegel |

(Continued)

FOREIGN PATENT DOCUMENTS

| WO | 9858237 A1 | 12/1998 |
| WO | 2014092825 A1 | 6/2014 |

OTHER PUBLICATIONS

Intention to Grant from counterpart European Application No. 16180242.6, dated Mar. 22, 2017, 47 pp.

(Continued)

*Primary Examiner* — Paul West
*Assistant Examiner* — Mark A Shabman
(74) *Attorney, Agent, or Firm* — Shumaker & Sieffert, P.A.

(57) ABSTRACT

An accelerometer as disclosed herein includes a support wafer, a bottom wafer, a top wafer, and an inductive pick-off. The support wafer may define a plane and may comprise a first side, a second side, and a proof mass. The proof mass may be configured to move in the plane defined by the support wafer. The bottom wafer may comprise a first side and a second side, and the first side may be positioned over the first side of the support wafer. The top wafer may comprise a first side and a second side, and the first side may be positioned over the second side of the support wafer. The inductive pick-off may comprise a near field resonant conductive coupling mechanism and may be configured to output a signal indicative of an amount of displacement of the proof mass to electronics.

17 Claims, 17 Drawing Sheets

(56) References Cited

U.S. PATENT DOCUMENTS

| | | | | |
|---|---|---|---|---|
| 4,555,946 | A * | 12/1985 | Capaldi | G01P 15/093 73/514.19 |
| 4,737,698 | A | 4/1988 | McMullin et al. | |
| 4,820,961 | A | 4/1989 | McMullin | |
| 4,878,553 | A | 11/1989 | Yamanami et al. | |
| 4,920,801 | A * | 5/1990 | Church | G01P 15/0802 73/514.16 |
| 4,944,184 | A * | 7/1990 | Blake | G01P 15/125 73/514.23 |
| 5,351,541 | A | 10/1994 | Petrovich et al. | |
| 5,456,109 | A * | 10/1995 | Lautzenhiser | G01P 3/44 702/141 |
| 6,481,286 | B1 | 11/2002 | Bernstein et al. | |
| 6,534,970 | B1 | 3/2003 | Ely et al. | |
| 7,030,782 | B2 | 4/2006 | Ely et al. | |
| 7,131,339 | B2 | 11/2006 | Kwun et al. | |
| 7,208,945 | B2 | 4/2007 | Jones et al. | |
| 7,868,609 | B2 | 1/2011 | Zhitomirskiy | |
| 8,781,542 | B2 | 7/2014 | Tsukamoto et al. | |
| 9,322,839 | B2 * | 4/2016 | Ricotti | G01P 15/105 |
| 2013/0255381 | A1 * | 10/2013 | Ricotti | G01P 15/105 73/514.31 |
| 2014/0132253 | A1 * | 5/2014 | Bertin | G01D 5/2086 324/207.17 |
| 2014/0157897 | A1 * | 6/2014 | Anagnost | G01P 15/005 73/514.35 |
| 2014/0331769 | A1 | 11/2014 | Fell | |

OTHER PUBLICATIONS

Trigona, "Energy autonomous MEMS transducers with contactless readout: from the system conception to the device realization," XIX Brainstorming Day, STMicroelectronics, Oct. 23, 2009, 43 pp.

Subramanian et al., "Servo Accelerometer for SRE Navigation system," retrieved from http://sensorsresearchsociety.org/Sensors2007CD/CP_57.pdf on May 8, 2015, 7 pp.

Extended Search Report from counterpart European Application No. 16180242.6, dated Sep. 16, 2016, 5 pp.

* cited by examiner

ACCELEROMETER WITH INDUCTIVE PICK-OFF

TECHNICAL FIELD

The disclosure relates to accelerometers.

BACKGROUND

Accelerometers may be categorized as open-loop accelerometers or closed-loop accelerometers. Open-loop accelerometers have proof masses that are displaced in the presence of inertial forces, and an amount of the displacement is measured to determine the acceleration value. By contrast, closed-loop accelerometers have proof masses that are maintained in a fixed position by a servo system. The force generated by the servo system necessary to maintain that position is measured to determine an acceleration value.

Conventional closed-loop accelerometer designs may utilize a capacitive pick-off to detect the displacement of a proof mass. Electrically conductive material (e.g., a capacitor plate) may be deposited on the upper surface of the proof mass, and similar electrically conductive material may be deposited on the lower surface of the proof mass. An acceleration or force applied along the sensitive axis of the accelerometer causes the proof mass to deflect either upwardly or downwardly causing the distance (e.g., a capacitive gap) between the pick-off capacitance plates and the upper and lower excitation rings to vary. This variance in the capacitive gap causes a change in the capacitance of the capacitive elements, which is representative of the displacement of the proof mass along the sensitive axis. The change in the capacitance may be used as a displacement signal and applied to a servo system that includes one or more electromagnets (e.g., a force-rebalancing coil) to return the proof mass to a null or at-rest position.

SUMMARY

In general, this disclosure is directed to systems, devices, and techniques that may increase temperature resistance (i.e., the ability to operate in harsh environments with ambient temperatures around 1000° C.) of an accelerometer, by utilizing an open-loop, dual-axis accelerometer with an inductive pick-off. The accelerometer may utilize near field inductive pick-off detecting in-plane motion of a proof mass. For example, the inductive pick-off may operate as a variable transformer using a near field resonant inductive coupling mechanism. In some examples, the inductive pick-off may include a transient magnetic field source and four inductive pick-off coils magnetically coupled with a target coil. The pick-off coil outputs feed inputs to electronics. The electronics may use a signal processing algorithm to determine the displacement of the proof mass. In some examples, the accelerometer die may be fabricated as a monolithic structure of three bonded wafers made of one material.

In one example, the disclosure is directed to an accelerometer including a support wafer, a bottom wafer, a top wafer, and an inductive pick-off. The support wafer defines a plane and includes a proof mass configured to move in the plane defined by the support wafer. The bottom wafer having a first side positioned over a first side of the support wafer. The top wafer having a first side positioned over a second side of the support wafer. The inductive pick-off including a near field resonant inductive coupling mechanism configured to output a signal to electronics, and the signal is indicative of an amount of displacement of the proof mass.

In another example, the disclosure is directed to an inductive pick-off system for an accelerometer. The inductive pick-off system including a source coil, a target coil, a plurality of pick-off coils. The source coil source coil is configured to receive an applied voltage to generate a source current, and transmit a first electromagnetic energy based on the source current. The target coil positioned on a proof mass of the accelerometer and configured to receive a portion of the first electromagnetic energy to generate a target current in the target coil, and transmit a second electromagnetic energy based on the target current. Each of the plurality of pick-off coils configured to receive a portion of the second electromagnetic energy to generate a pick-off voltage signal, and output the pick-off voltage signal to electronics, and the plurality of pick-off voltage signals are indicative of an amount of displacement of the proof mass of the accelerometer.

In yet another example, the disclosure is directed to a method including receiving, by a source coil, an applied voltage to generate a source current in the source coil, transmitting, by the source coil, a first electromagnetic energy based on the source current, receiving, by a target coil positioned on a proof mass, a portion of the first electromagnetic energy to generate a target current in the target coil, transmitting, by the target coil, a second electromagnetic energy based on the target current, receiving, by each of a plurality of pick-off coils, a portion of the second electromagnetic energy to generate a pick-off voltage signal, and outputting, by each of the plurality of pick-off coils, the pick-off voltage signal to electronics, wherein the plurality of pick-off voltage signals are indicative of an amount of displacement of a proof mass.

The details of one or more examples of the disclosure are set forth in the accompanying drawings and the description below. Other features, objects, and advantages of the disclosure will be apparent from the description and drawings, and from the claims.

DETAILED DESCRIPTION

The aerospace industry and the oil & gas drilling industries are in a commercial need of an accelerometer that can operate in harsh environments (e.g., environments with ambient temperature of up to 1000° C. or higher). Conventional accelerometer design utilizes a capacitive pickoff that is not suitable for high temperature applications. Specifically, in some examples, high temperature sensors operating in harsh environments require lengthy high temperature cables connecting sensor electronics with the transducer. The sensor electronics may receive signals from the conventional transducer with a significant error level due to the cable connection and high-frequency characteristics of the transducer. Additionally, in some examples, high temperature accelerometers may be made from high temperature materials, such as oxide crystals with high bond energy. In these examples, conventional micromachining microelectromechanical systems (MEMS) technologies require significant changes in the recipes to be applied in manufacturing a high temperature accelerometer. In contrast to the conventional accelerometer design, the devices and techniques described herein provide a simple and robust accelerometer design with high temperature stability and hermetic sealing on the wafer level. Additionally, the devices and techniques described herein may operate a lower frequency domain than convention accelerometers, which may prevent difficulties in the electrical connection caused by impedance matching between the transducer and the electronics.

In general, the devices and techniques disclosed herein relate to an open loop, dual axis accelerometer with an inductive pick-off. In contrast to the conventional accelerometers described above, the accelerometer dies of this disclosure may be made from high temperature-tolerant materials utilizing micromachining techniques (e.g., MEMS technologies).

Figure 1:
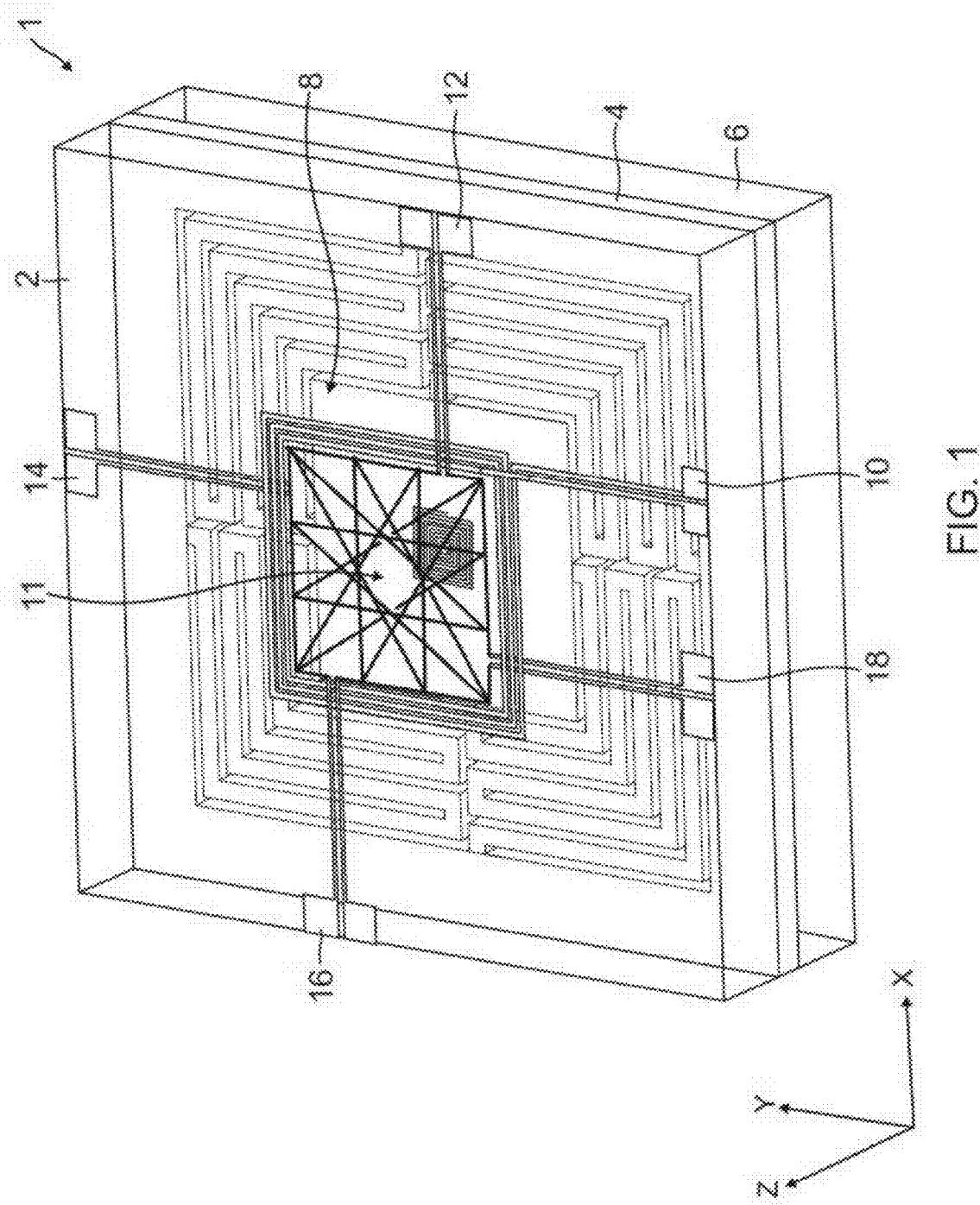
FIG. 1 is a conceptual diagram illustrating a perspective view of an accelerometer with a top wafer, a support wafer, and a bottom wafer, in accordance with the techniques described herein.

FIG. 1 is a conceptual diagram illustrating a perspective view of accelerometer 1. Accelerometer 1 includes top wafer 2, support wafer 4, bottom wafer 6, and inductive pick-off 8. Accelerometer 1 includes a proof mass, which may be a hermetically encapsulated moving body. For example, support wafer 4 may include a proof mass. In the example of FIG. 1, inductive pick-off 8 (e.g., an inductive pick-off system) includes source coil 10, pick-off coils 12-18. In some examples, source coil 10 and pick-off coils 12-18 may have connection pads at the edges of top wafer 2. In some examples, source coil 10 may be on bottom wafer 6, and some or all of pick-off coils 12-18 may be on top wafer 2. In other examples, source coil 10 may be on top wafer 2, and some or all of pick-off coils 12-18 may be on bottom wafer 6.

Support wafer 4 defines a plane and includes a proof mass. The proof mass of support wafer 4 may displace in-plane within the plane defined by support wafer 4. For example, the proof mass may displace in response to an inertial load applied to accelerometer 1. In some examples, accelerometer 1 may hermetically encapsulate the proof mass of support wafer 4 with top wafer 2 and bottom wafer 6 bonded to support wafer 4. In some examples, accelerometer 1 may be fabricated as a monolithic structure of three bonded wafers (e.g., top wafer 2, support wafer 4, and bottom wafer 6). In other words, accelerometer 1 may include three bonded wafers, and the three bonded may be made from one single piece of material. In some examples, the monolithic structure may include top wafer 2 and bottom wafer 6, and a proof mass supported by support wafer 4 with elastic springs. Accelerometer 1 may also be made from a high temperature material including i-type or undoped semiconductors, oxide crystals, dielectrics, or any other high temperature material capable of operating at ambient temperatures of up to 1000° C. The undoped semiconductors may include, but are not limited to, undoped single crystal silicon (Si), undoped gallium arsenide (GaAs), undoped silicon carbide (SiC), undoped aluminum nitride (AlN), and undoped gallium nitride (GaN). Additionally or alternatively, in some examples, the oxide crystals or dielectrics may include, but are not limited to sapphire, fused quartz, and alumina ceramics.

Accelerometer 1 may detect the in-plane motion of the proof mass with inductive pick-off 8. In some examples, the proof mass may be a pattern of trenches making a flexible suspension pattern etched upon a single substrate (e.g., a flexible suspension pattern etched in support wafer 4). The proof mass responds to applied inertial load, and moves parallel to a planar surface of inductive pick-off and within the plane defined by support wafer 4.

Inductive pick-off 8 operates as a variable transformer utilizing a near field resonant inductive coupling mechanism. Resonant inductive coupling or electrodynamic induction is the near field wireless transmission of electrical energy between two or more magnetically coupled coils. In some examples, the excitation frequency used by near field inductive pick-off 8 to operate may be in the megahertz (MHz) frequency range. In other words, the excitation signal wavelength is several orders of magnitude greater than the size of accelerometer 1. For example, the wavelength may be in meters, whereas the size of accelerometer 1 may be in the range of millimeters. In this manner, accelerometer 1 operates within a lower frequency range than conventional accelerometers allowing accelerometer 1 to reduce and/or eliminate the significant error levels potentially caused by the use of lengthy high temperature cables. The phase and amplitude of low frequency signals do not change significantly while transferring through high temperature cables, which connect electronics with accelerometer 1, thus enabling accelerometer 1 to operate at higher temperatures than conventional accelerometers. In some examples, the unique features of inductive pick-off 8 may allow the sensor output to be immune to in-plane rotation, out of plane displacement, and tilting of the proof mass.

In some examples, source coil 10 may be sputtered on the outside of top wafer 2. In some examples, pick-off coils 12-18 may also be sputtered on the outside of top wafer 2. In some examples, a target coil may be sputtered on a first side of the proof mass. In some examples, source coil 10 may form aperture 11. In these examples, the target coil may be positioned below aperture 11 in the Z-direction and positioned within aperture 11 in the X-direction and Y-direction ("dual-axis"). Similarly, in some examples, the winding of pick-off coils 12-18 may be substantially positioned within aperture 11 of source coil 10 in the X, Y, and Z directions. In some examples, pick-off coils 12-18 may be positioned slightly above aperture 11 of source coil 10 in the Z-direction because pick-off coils 12-18 may have dielectrics layers placed between source coil 10 and each other to ensure electrical insulation.

In some examples, devices and techniques described herein may have one or more advantages including, but not limited to, manufacturing simplicity and reduced costs, simplified printed circuit board (PCB) electronics, simplified packaging (e.g., no hermetic package required because of the bonded wafers), capable of operating in harsh environments (e.g., ambient temperatures of up to 1000° C.), decreased temperature sensitivity, and simplified coil windings over conventional contact-less position sensing (CLPS) coil windings with increases in performance.

For example. Conventional CLPS-technology based antenna design may consider target winding (coil) moving along transmit coil, which locates on the perimeter of the proximity sensor antenna PCB, and the other coils placed inside of the transmit coil winding loop. However, to process received signals, the shape of each of the coils has to be designed to perform and be different from each other, such that each of the coils provides its own winding and approximation of the signal modulation with target position.

For example, the receive windings of CLPS-technology are designed to have shape causing coupling factor modulation with target position based on either a sine (SIN) function or cosine (COS) function. However, the CLPS-technology has difficulties with cross-talk (breakthrough) signal minimization and with coil intersection causing shortening of the traces from different windings.

Unlike the coil windings in CLPS-technology the coil windings of pick-off coils 12-18 may be identical with each other and aligned with either the X-axis and Y-axis, such that each of pick-off coils 12-18 differ from each other by the respective center offset. In this way, signal processing such as summation or subtraction of the signals from adjacent coil pair provide either a SIN or COS signal modulation with target position.

Figure 2:
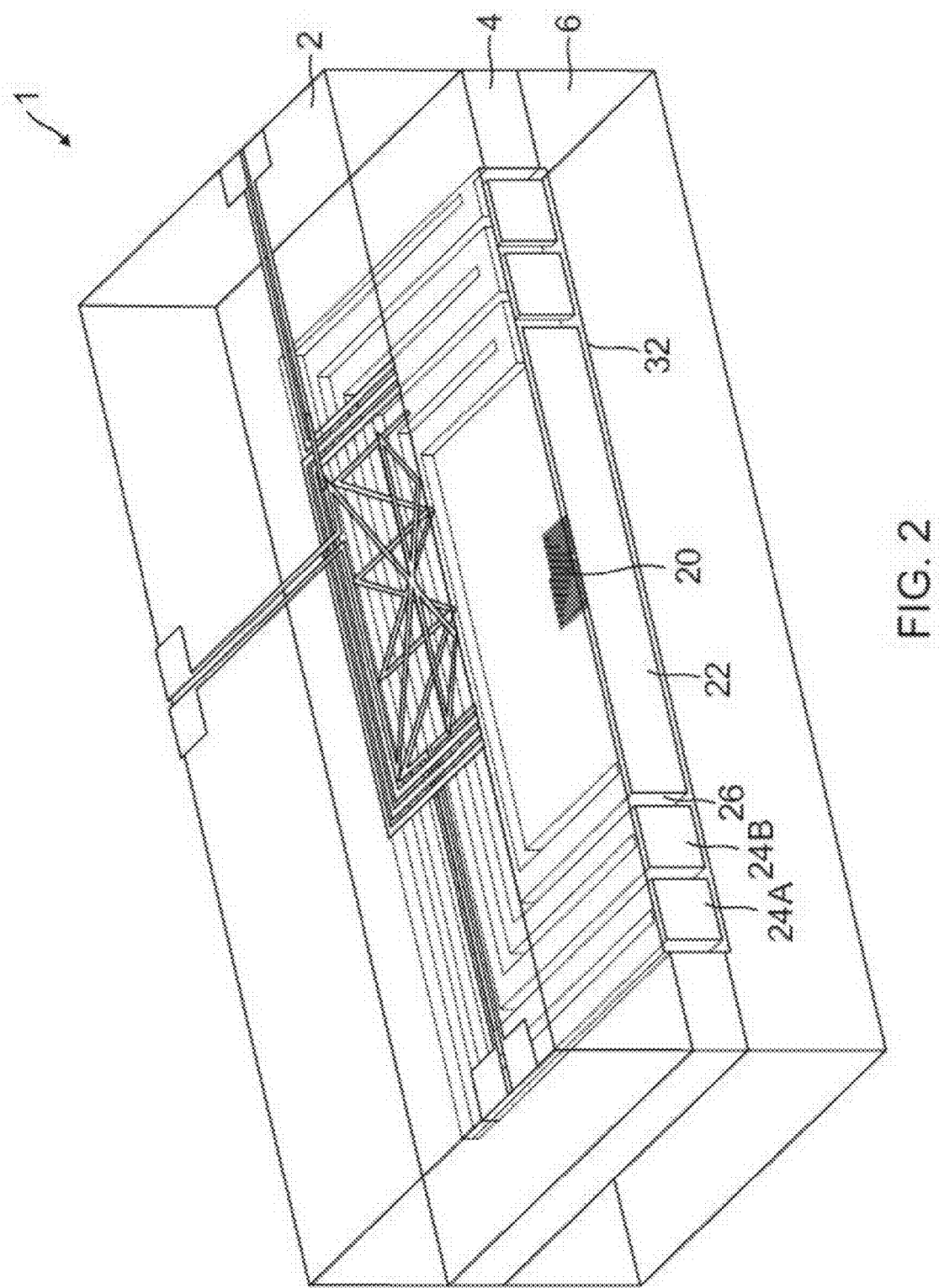
FIG. 2 is a conceptual diagram illustrating a cross-section of the accelerometer of FIG. 1.

FIG. 2 is a conceptual diagram illustrating a cross-section of the accelerometer of FIG. 1, in accordance with the techniques described herein. FIG. 2 is described with reference to FIG. 1. In the example of FIG. 2, accelerometer 1 includes top wafer 2, support wafer 4, bottom wafer 6. Additionally, in the example of FIG. 2, accelerometer 1 includes support wafer 4 with target coil 20 on proof mass 22 (e.g., a hermetically encapsulated moving body), proof mass flexures 24A and 24B (collectively "proof mass flexures 24"), top wafer recess 26, and bottom wafer recess 28.

In the example of FIG. 2, top wafer 2 includes recess 26, and bottom wafer 6 includes recess 27. Proof mass 22 is supported by proof mass flexures 24 connected to a support section of support wafer 4 and is configured to displace in-plane. Proof mass 22, proof mass flexures 24, top wafer recess 26, and bottom wafer recess 28 may be etched by deep reactive-ion etching (DRIE) or any other suitable process to allow proof mass 22 to displace in a plane defined by support wafer 4 in response to an inertial load applied to accelerometer 1. In some examples, support wafer 4 may be bonded to top wafer 2 and bottom wafer 6 to form a microelectromechanical system (MEMS) accelerometer die with a monolithic structure.

Figure 3:
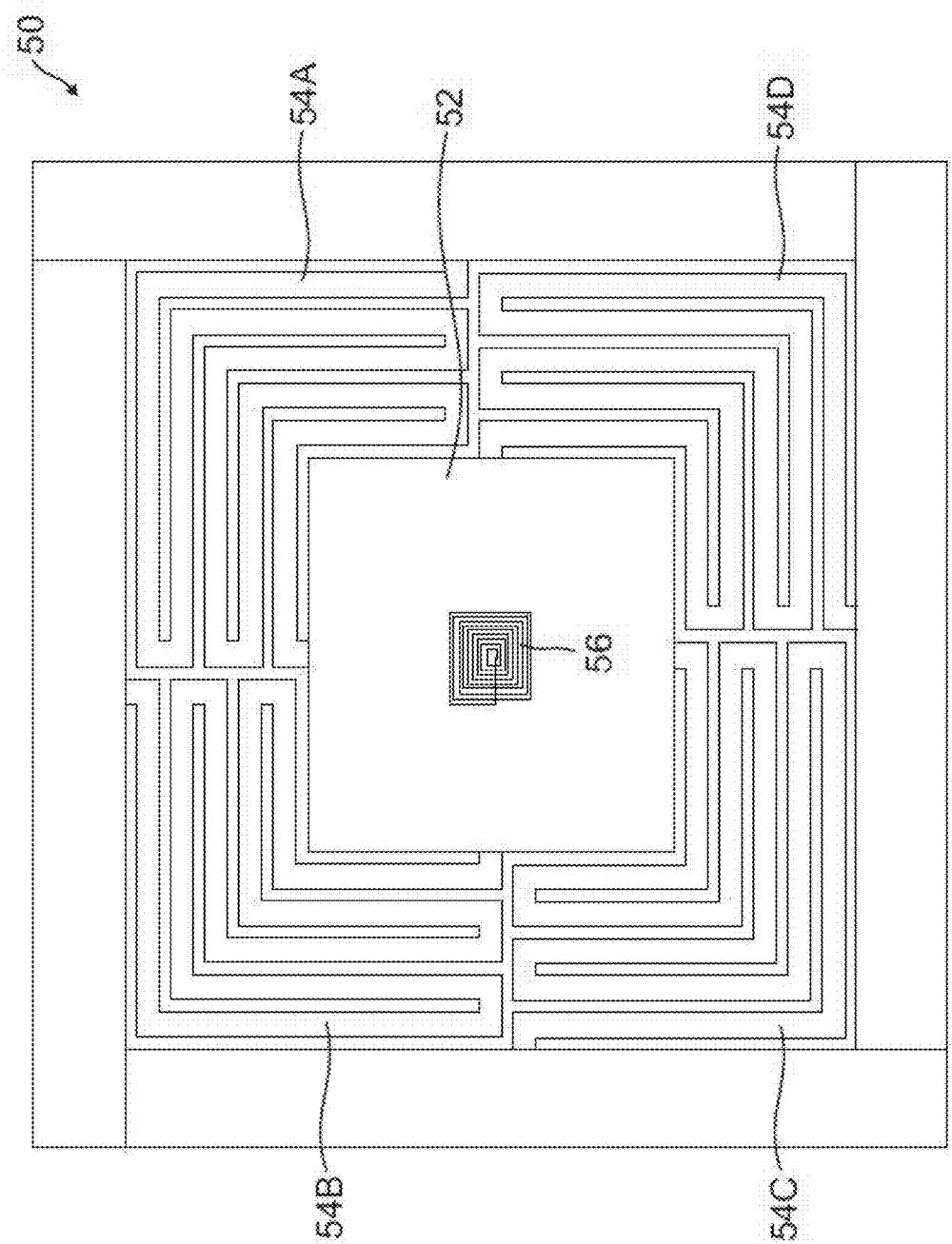
FIG. 3 is a conceptual diagram illustrating a top view of an example support wafer with a proof mass, proof mass flexures, and a target coil, in accordance with the techniques described herein.

FIG. 3 is a conceptual diagram illustrating a top view of an example support wafer 50 with proof mass 52, proof mass flexures 54A-54D (collectively "proof mass flexures 54"), and target coil 56, in accordance with the techniques described herein. In some examples, support wafer 50 may correspond to support wafer 4 as described in FIGS. 1 and 2. In these examples, proof mass 52, proof mass flexures 54, and target coil 56 may also correspond to proof mass 22, proof mass flexures 24, and target coil 20, respectively as described in FIGS. 1 and 2.

In some examples, proof mass 52 may displace in-plane with a plane defined by support wafer 50. In some examples, proof mass 52 may displace parallel to a plane defined by proof mass 52. In some examples, proof mass 52 may displace in the X-direction. In some examples, proof mass 52 may displace in the Y-direction. In some examples, proof mass 52 may displace in both the X-direction and the Y-direction. In some examples, proof mass 52 may not displace in the Z-direction.

In some examples, target coil 56 may be one of an LC-resonator or an inductive coil. In some examples, target coil 56 may be positioned substantially near the center of proof mass 52 with a tolerance of less than one percent of the coil metal trace width. In some examples, target coil 56 is a planar coil. In some examples, target coil 56 may be completely encapsulated within accelerometer 1 with no external connections.

In some examples, proof mass flexures 54 may be flexible in the X direction and/or the Y-direction. In some examples, proof mass flexures 54 may be stiff in the Z direction. In some examples, proof mass flexures 54 may be etched trenches that form a suspension beam pattern.

Figure 4:
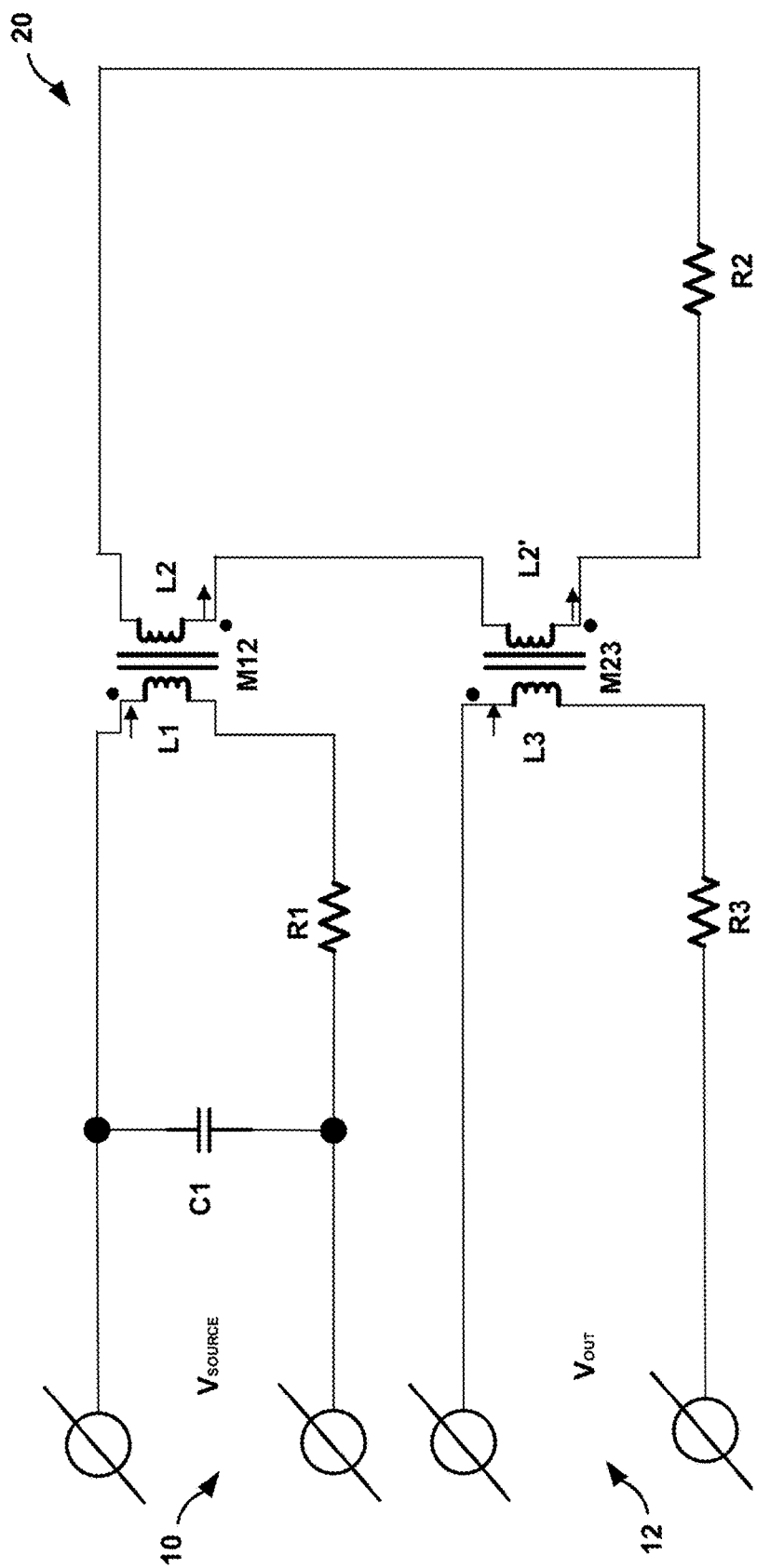
FIG. 4 is a circuit diagram illustrating an example of inductive coupling between a source coil, a target coil, and a pick-off coil, in accordance with the techniques described herein.
Figure 5:
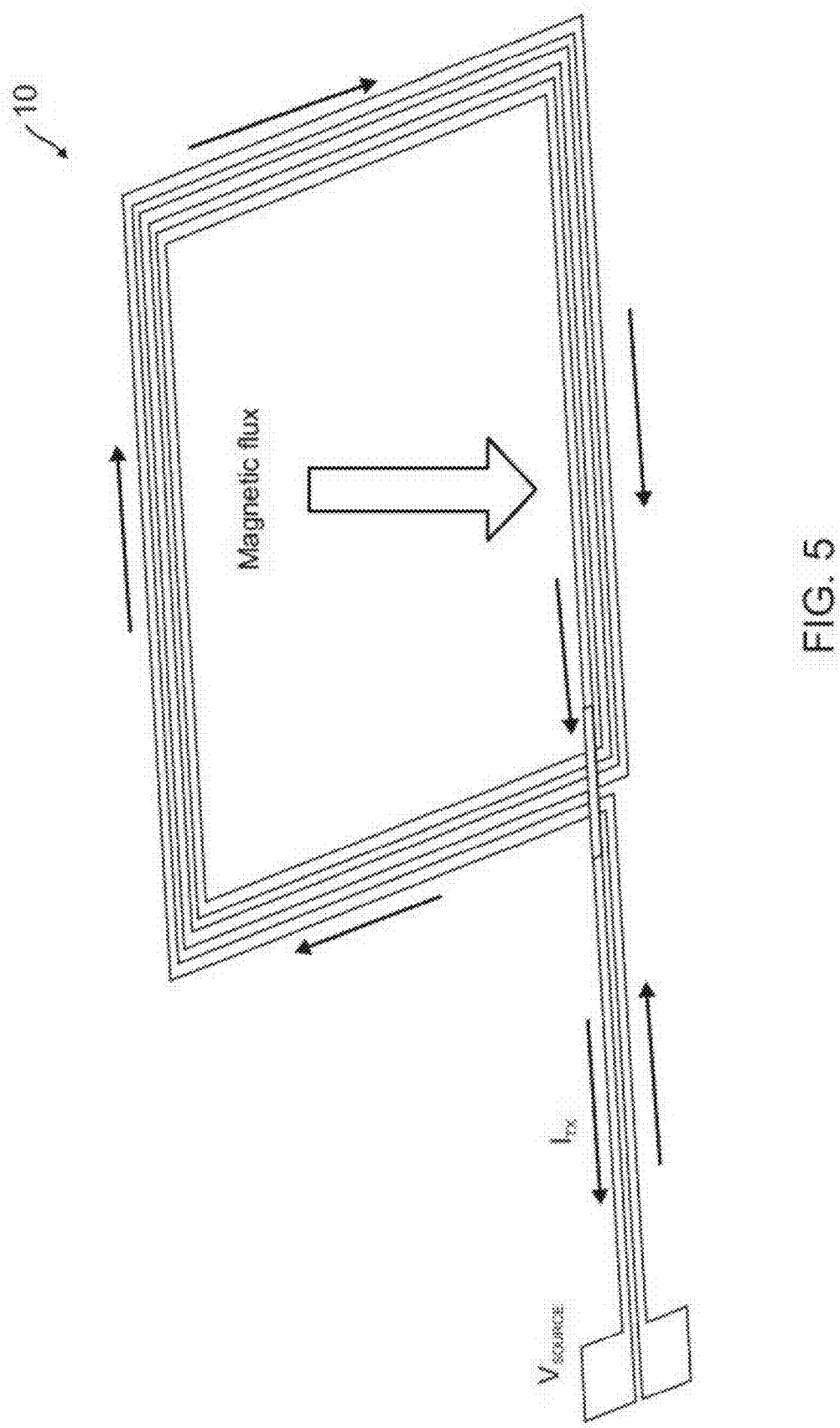
FIG. 5 is a conceptual diagram illustrating an example of the source coil, in accordance with the techniques described herein.

FIG. 4 is a circuit diagram illustrating an example of inductive coupling between source coil 10, target coil 20, and one of a plurality of pick-off coils 12-18, in accordance with the techniques described herein. FIG. 4 is described with reference to FIGS. 1 and 2. In the example of FIG. 4, source coil 10 includes inductor L1 in series with resistor R1 and in parallel with capacitor C1. In the example of FIG. 4, target coil 20 includes inductors L2 and L2' in series with resistor R2. In the example of FIG. 4, pick-off coil 12 includes inductor L3 in series with resistor R3. For example, FIG. 5 is a conceptual diagram illustrating an example of source coil 10, in accordance with the techniques described herein. A transient voltage ($V_{source}$) may be applied to RF-signal source coil 10 that induces a source current ($I_{TX}$) and generates a transient magnetic field that magnetically couples (M12) target coil 20 with source coil 10. In some examples, where $V_{source}=V_s \exp(j\omega t)$ is transient voltage frequency of, $\omega=2\pi f$, the current is $I_{TX}(t)=I_{TX}\exp(j\omega t)$, where $j^2=-1$, and t is time. In some examples, target coil 20 may be an inductive target coil (e.g., inductor L2 in series with resistor R2). In other examples, target coil 20 may be an LC-resonator coil. The transient magnetic field of source coil 10 that magnetically couples (M12) target coil 20 with source coil 10 induces an oscillating target current through target coil 20, which generates an oscillating magnetic field of target coil 20. In other words, source coil 10 may generate a transient magnetic field and transmit electrical energy to target coil 20 and target coil 20 may receive the electrical energy transmitted by source coil 10 due to magnetic coupling (M12) of target coil 20 with source coil 10. For example, target coil 20 may be an inductive target coil and highly resonant, and any electrical energy transmitted by source coil 10 and received by target coil 20 may decay away relatively slowly over many cycles at resonant frequency oscillations.

In some examples, when another coil (e.g., pick-off coil 12 or RX-coil) or plurality of coils (e.g., pick-off coils 12-18) is near target coil 20, pick-off coil 12 may receive a significant portion of the electrical energy transmitted (e.g., reflected energy from source coil 10) by target coil 20 before the electrical energy is dissipated due to magnetic coupling (M23) of pick-off coil 12 with target coil 20. In these examples, pick-off coil 12 may receive the electrical energy even if pick-off coil 12 is some distance away from target coil 20. In other words, target coil 20 may generate an oscillating magnetic field and transmit electrical energy received from source coil 10 to pick-off coil 12, and pick-off coil 12 may receive the electrical energy transmitted by target coil 20 due to magnetic coupling (M23) of pick-off coil 12 with target coil 20.

In some examples, target coil 20 may operate as an inductive target, and the inductive target tracks the displacement of the proof mass (e.g., proof mass 22 as described in FIG. 2). In some examples, one or more of pick-off coils 12-18 may operate as a pick up antennae that provide up to a four-channel output in voltage domain (e.g., voltages V1, V2, V3, and/or V4). In these examples, the voltage signals may be processed by electronics with a processor and memory that stores a signal processing algorithm to calculate in-plane position of target coil 20 relative to the one or more pick-off coils 12-18.

Figure 6:
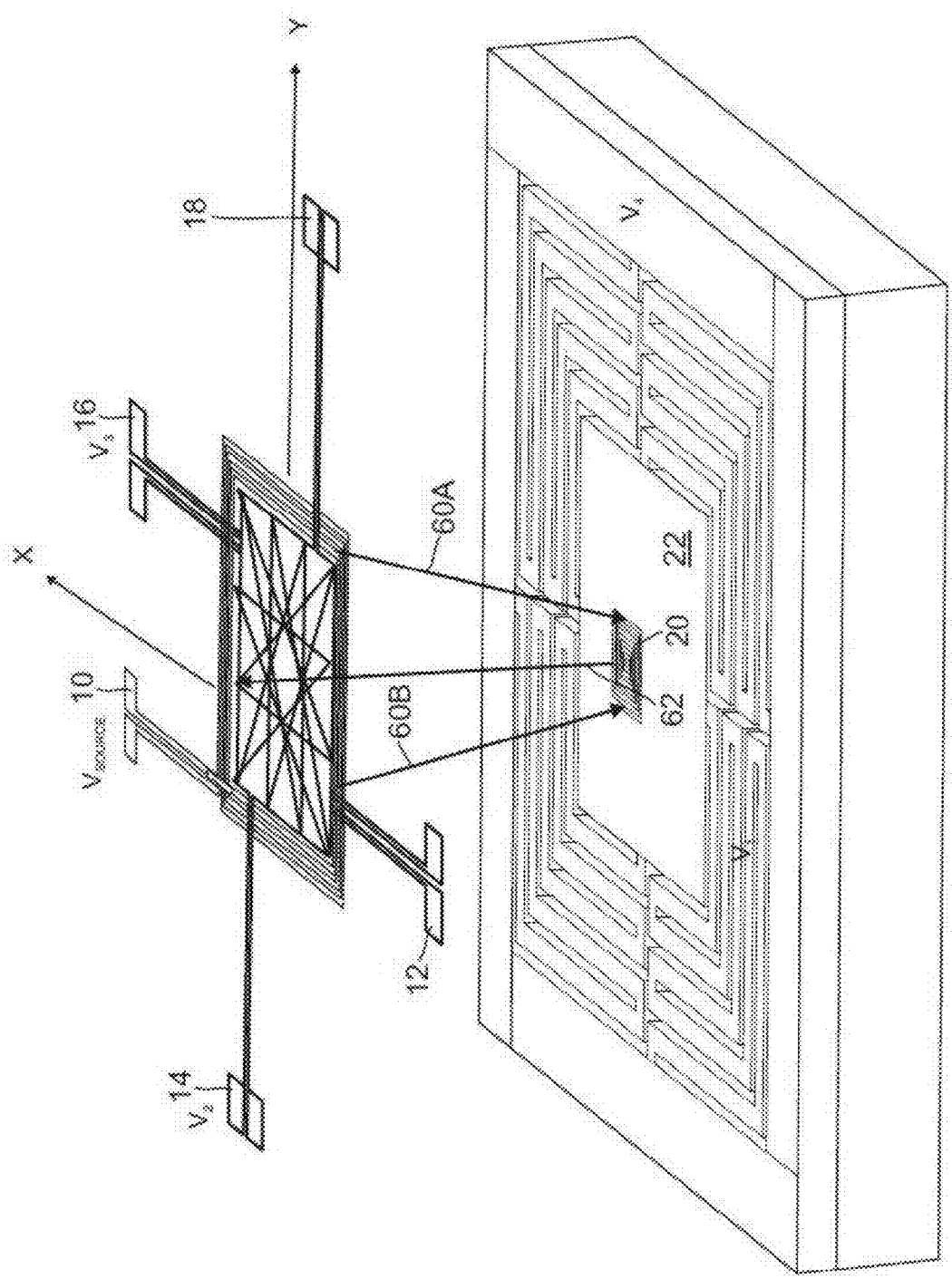
FIG. 6 is a conceptual diagram illustrating an example inductive pick-off with a source coil, a target coil, and one of a plurality of pick-off coils, in accordance with the techniques described herein.

FIG. 6 is a conceptual diagram illustrating an example inductive pick-off with source coil 10, target coil 20, and plurality of pick-off coils 12-18, in accordance with the techniques described herein. FIG. 6 is described with reference to FIGS. 1 and 2.

In the example of FIG. 6, a transient voltage ($V_{source}$) is applied to the pads of signal source coil 10 that induces electric current ($I_{TX}$) and propagates in the traces of source coil 10. The source current flow generates an oscillating magnetic flux causing electromagnetic energy exchange i.e., transmission of source signals 60A and 60B (collectively "source signal 60"). Source signal 60 may induce an oscillating target current in target coil 20 and generates an oscillating magnetic flux causing electromagnetic energy exchange i.e., the transmission of reflected signal 62. Pick-off coils 12-18 may each receive a portion of the transmitted reflected signal 62.

In the example of FIG. 6, voltages $V_1$ and $V_3$ at the pad outputs of pick-off coils 12 and 16 are indicative of an amount of displacement of proof mass 22 in the X-direction. In the example of FIG. 6, voltages V2 and V4 at the pad outputs of pick-off coils 12 and 16 are indicative of an amount of displacement of proof mass 22 in the Y-direction.

Figure 7:
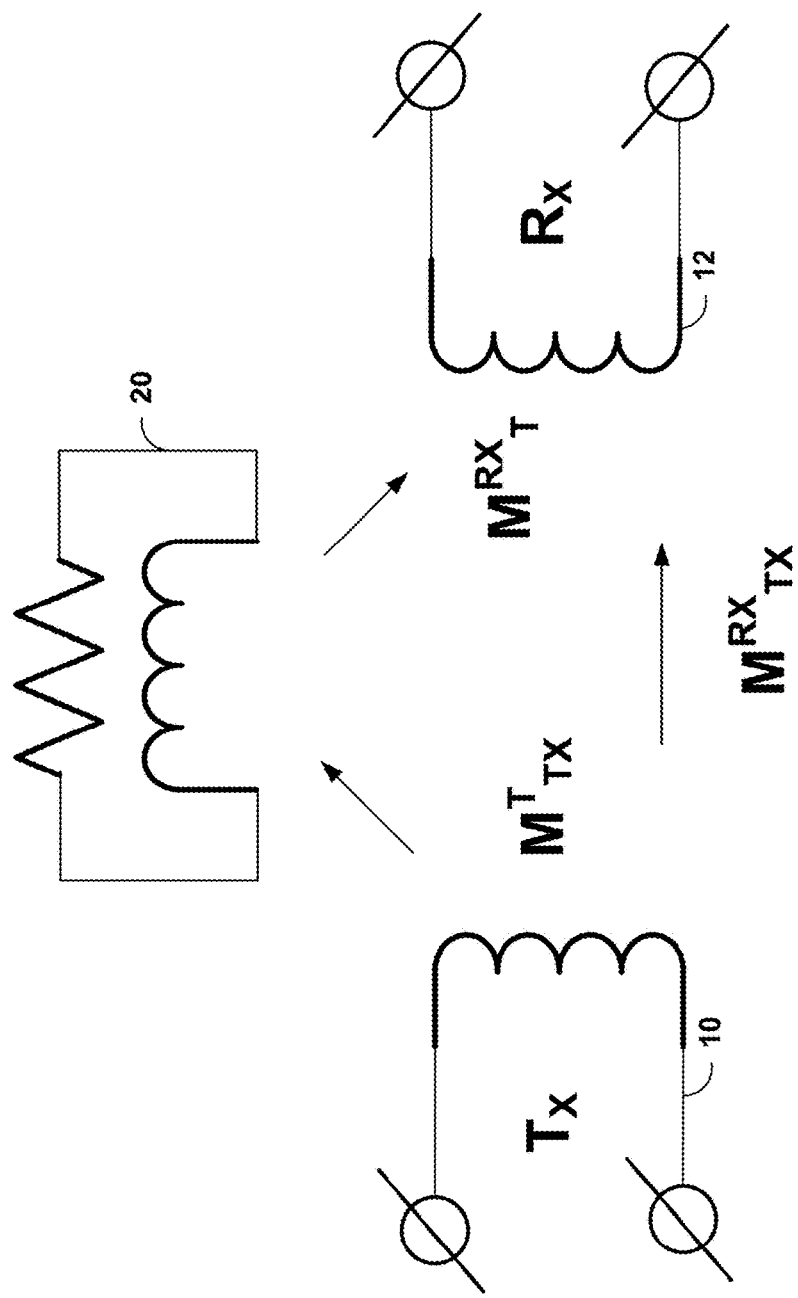
FIG. 7 is a conceptual diagram illustrating wireless transmission of electromagnetic energy between the source coil, the target coil, and one of the plurality of pick-off coils, in accordance with the techniques described herein.

FIG. 7 is a conceptual diagram illustrating wireless transmission of electromagnetic energy between source coil 10, target coil 20, and one of the plurality of pick-off coils 12-18, in accordance with the techniques described herein. In other words, FIG. 7 illustrates the electromagnetic energy exchange diagram causing mutual inductance ($M^T_{TX}$) between source coil 10 and target coil 20, mutual inductance ($M^T_{RX}$) between target coil 20 and pick-off coil 12, and mutual inductance ($M^{RX}_{TX}$) between source coil 10 and pick-off coil 12.

For example, electromagnetic energy exchange between signal source coil 10 and pick-off coil 12, named cross-talk effect, causes breakthrough voltage signal, $V_{RX}$, generated in pick-off coil 12. In time domain $V_{RX}=M^{RX}_{TX}$ (d $I_{TX}$/dt). In case of a harmonic source signal with frequency ($\omega=2\pi f$) $V_{RX}$ may be defined as Equation 1.

$$V_{RX} = j\omega M^{RX}_{TX} I_{TX} \qquad (1)$$
$$= j\omega \sqrt{L_{TX} L_{RX}}\, k^{RX}_{TX} I_{TX}$$

In Equation 1, mutual inductance $M^{RX}_{TX}$ may be defined as between source coil 10 and pick-off coil 12, and $M^{RX}_{TX}$ may be expressed in the terms of a non-dimensional coupling factor ($k^{RX}_{TX}$). The coupling factor definition may be $$k^{RX}_{TX} = \frac{M^{RX}_{TX}}{\sqrt{L_{TX} L_{RX}}},$$

where $L_{RX}$ is inductance of pick-off coil 12, and $L_{TX}$ is inductance of signal source coil 10.

Coupling factor, $k^{RX}_{TX}$, is a function of coil pair shape and the overlapping areas of signal source coil 10 and pick-off coil 12. To achieve high accuracy displacement measurement of a proof mass (e.g., proof mass 22 as described in FIG. 2), breakthrough signal $V_{RX}$ must be several orders of magnitude below pick-off coil voltage signal level. In other words, pick-off coil 12 may be designed to have $k^{RX}_{TX}=0$.

Figure 8:
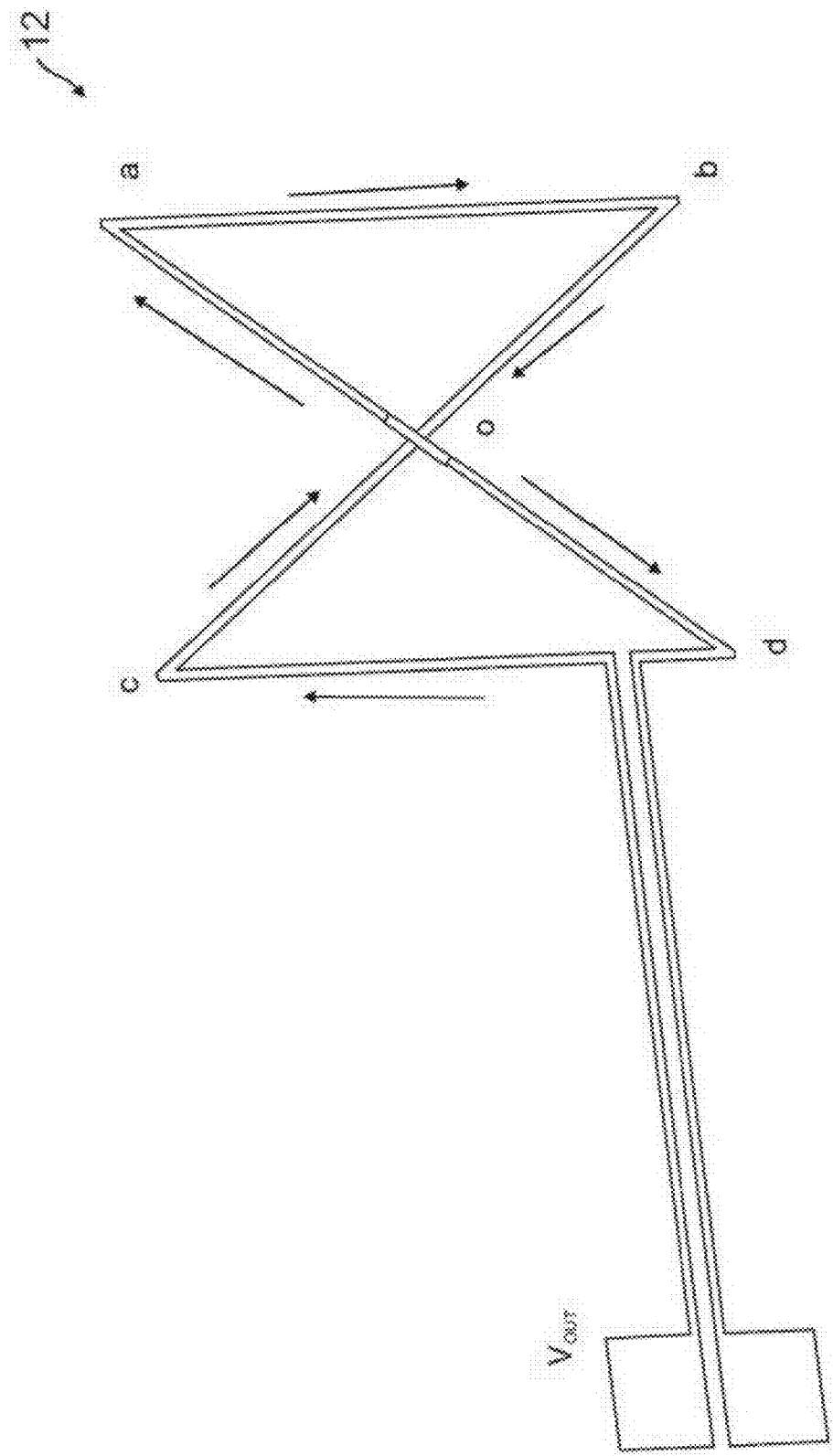
FIG. 8 is a conceptual diagram illustrating an example of one of the plurality of pick-off coils of FIG. 5.

FIG. 8 is a conceptual diagram illustrating an example of one of the plurality of pick-off coils of FIG. 5, in accordance with the techniques described herein. In the example of FIG. 8, pick-off coil 12 has a coil winding with a coupling factor, $k^{RX}_{TX}=0$ or $k^{RX}_{TX} \ll k^{RX}_{T}$. In other words, the coupling factor between source coil 10 and pick-off coil 12 may be several orders of magnitude less than the coupling factor between target coil 20 and pick-off coil 12.

For example, a RF-signal source coil generates a transient magnetic field and magnetically couples with a target coil. The target coil magnetically couples with each of the coil windings of the plurality of pick-off coils including pick-off coil 12. For example, the target coil magnetically couples with (oabo) and (odco), with induced electromotive forces (EMF) $V_{oabo}=V_{oa}+V_{ab}+V_{bo}$ and $V_{odco}=V_{co}+V_{dc}+V_{od}$. The resultant EMF is $V_{OUT}=V_{oa}+V_{ab}+V_{bo}+V_{oc}+V_{cd}+V_{do}$.

In the example of FIG. 8, pick-off coil 12 generates a homogeneous electromagnetic field inside of the coil winding of pick-off coil 12. In other words, if the loops, i.e., (oabo) & (odco), have congruent shapes, then $V_{ab}=-V_{cd}$; $V_{ob}=-V_{oc}$; and $V_{od}=-V_{oa}$. In other words, the voltage across section ab of pick-off coil 12 is opposite the voltage across section cd and cancel out; the voltage across section ob is opposite the voltage across section oc and cancel out; and the voltage across section od is opposite the voltage across section oa and cancel. In this way, $V_{OUT}=0$, $M^{RX}_{TX}=0$, and $k^{RX}_{TX}=0$ or substantially close to zero.

In the example of FIG. 8, pick-off coil 12 includes a coil winding with two approximately congruent triangles, which have coupling factors between a coil loop and transmit coil, $k^{Loop}_{TX}$, and match each other with tolerance below 0.02%.

In other examples, pick-off coil 12 may include a coil winding with two congruent shapes based on a sine (SIN) trigonometric function.

In some examples, the excitation voltage of source coil 10 may be at the resonant frequency of target coil 20, $\omega=(L_T C_T)^{1/2}$. The electromagnetic energy exchange between source coil 10 and target coil 20, and between target coil 20 and pick-off coil 12 may be characterized by mutual inductances, $M^T{}_{TX}$ and $M^{RX}{}_T$. In some examples, where $k^{RX}{}_{TX}=0$, output voltage of pick-off coil 12, $V_{OUT}$, is calculated by Equation 4.

$$0 = V_T = \left(R_T + j\omega L_T + \frac{1}{j\omega C_T}\right)I_T + j\omega M^T_{TX}I_{TX} \tag{2}$$

$$I_T = -\frac{j\omega M^T_{TX}}{R_T}I_{TX} \text{ (resonant frequency)} \tag{3}$$

$$V_{OUT} = j\omega M^{RX}_T I_T \tag{4}$$
$$= \omega^2 \frac{M^T_{TX}M^{RX}_T}{R_T}I_{TX}$$
$$= \omega\sqrt{L_{TX}L_{RX}}\, k^T_{TX}Q_T k^{RX}_T I_{TX},$$

$$Q_T = \frac{\omega L_T}{R_T}$$

As the coil winding of target coil 20 is a loop, the voltage drop of target coil 20 is $V_T=0$. In Equations 2-4, $I_T$ is induced target current flowing through target coil 20. $I_{TX}$ is source excitation current, $Q_T$ is the quality factor of target coil 20, $L_T$ is inductance of target coil 20, $C_T$ is capacitance of target coil 20, $R_T$ is resistance of target coil 20.

The magnetic coupling or mutual inductance between target coil 20 and pick-off coil 12, and between source coil 10 and target coil 20 is usually described in the terms of coupling factors, $k^{RX}{}_T$ and $k^{RX}{}_{TX}$. For example, the coupling factor between pick-off coil 12 and target coil 20 may be $$k^{RX}_T = \frac{M^{RX}_T}{\sqrt{L_T L_{RX}}}$$

and the coupling factor between source coil 10 and target coil 20 may be $$k^T_{TX} = \frac{M^T_{TX}}{\sqrt{L_T L_{TX}}}.$$

Figure 9:
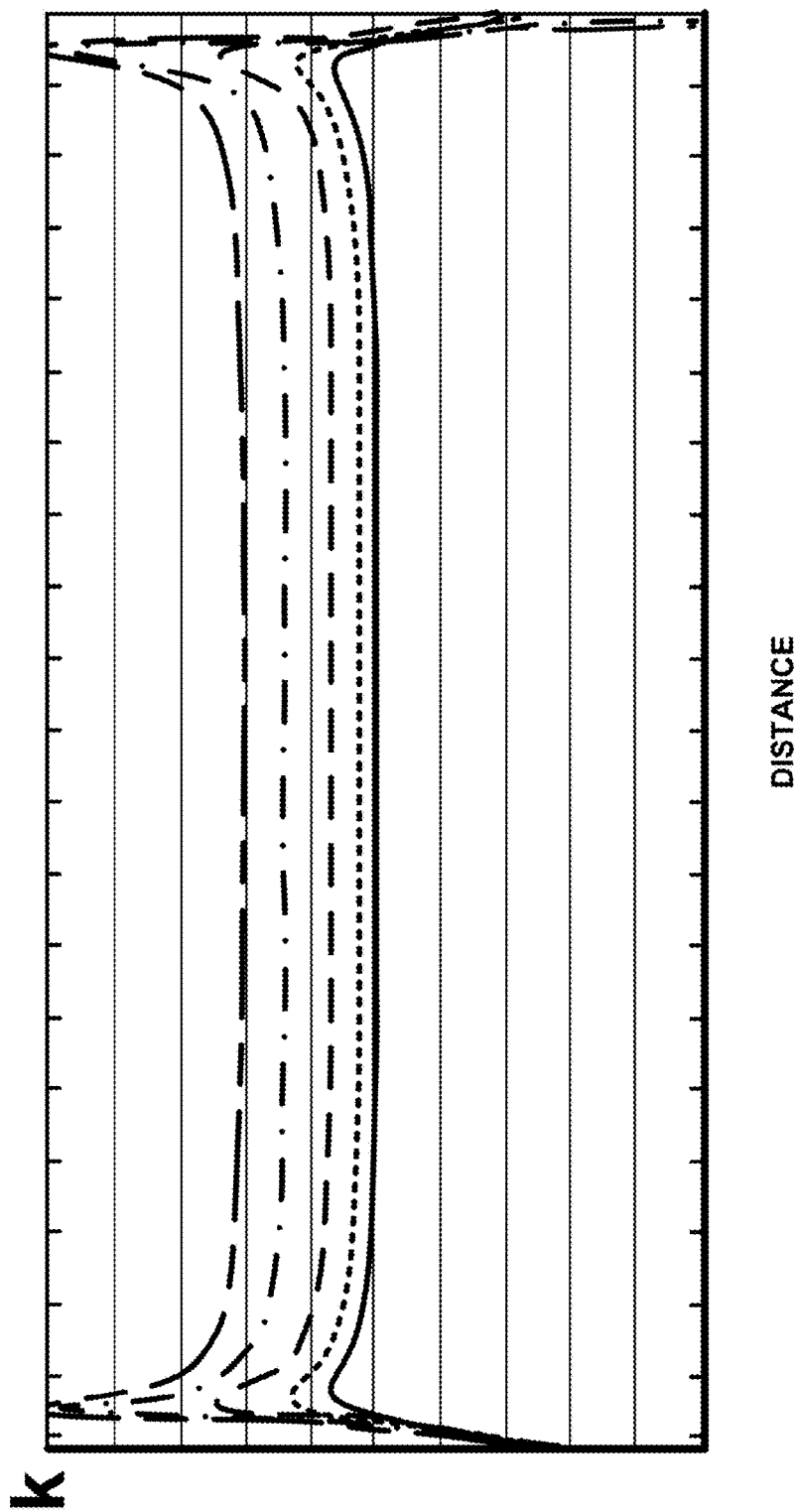
FIG. 9 is a chart illustrating an example coupling factor variation between the source coil and the target coil over a cross section of the source coil, in accordance with the techniques described herein.

In some examples, the coupling factor between source coil 10 and target coil 20, $k^T{}_{TX}$, may not change significantly over the span of source coil 10, i.e., $k^T{}_{TX}$ may be substantially constant. For example, FIG. 9 illustrates an example of coupling factor variation, $k^T{}_{TX}$, over a cross section of source coil 10. As illustrated in FIG. 9, spikes in the coupling factor variation occur at the location of a portion of the coil winding. In some examples, the coupling factor between pick-off coil 12 and target coil 20 may vary significantly based on the position of target coil 20, $k^{RX}_T = f(X_T, Y_T)$, where $X_T$ and $Y_T$ are two-dimensional (2-D) coordinates of the center of target coil 20. In other words, the voltage output, $V_{OUT}$, of each pick-off coil is indicative of the amount of displacement of the center of target coil 20, and therefore, indicative of the amount of displacement of proof mass 22.

Figure 10:
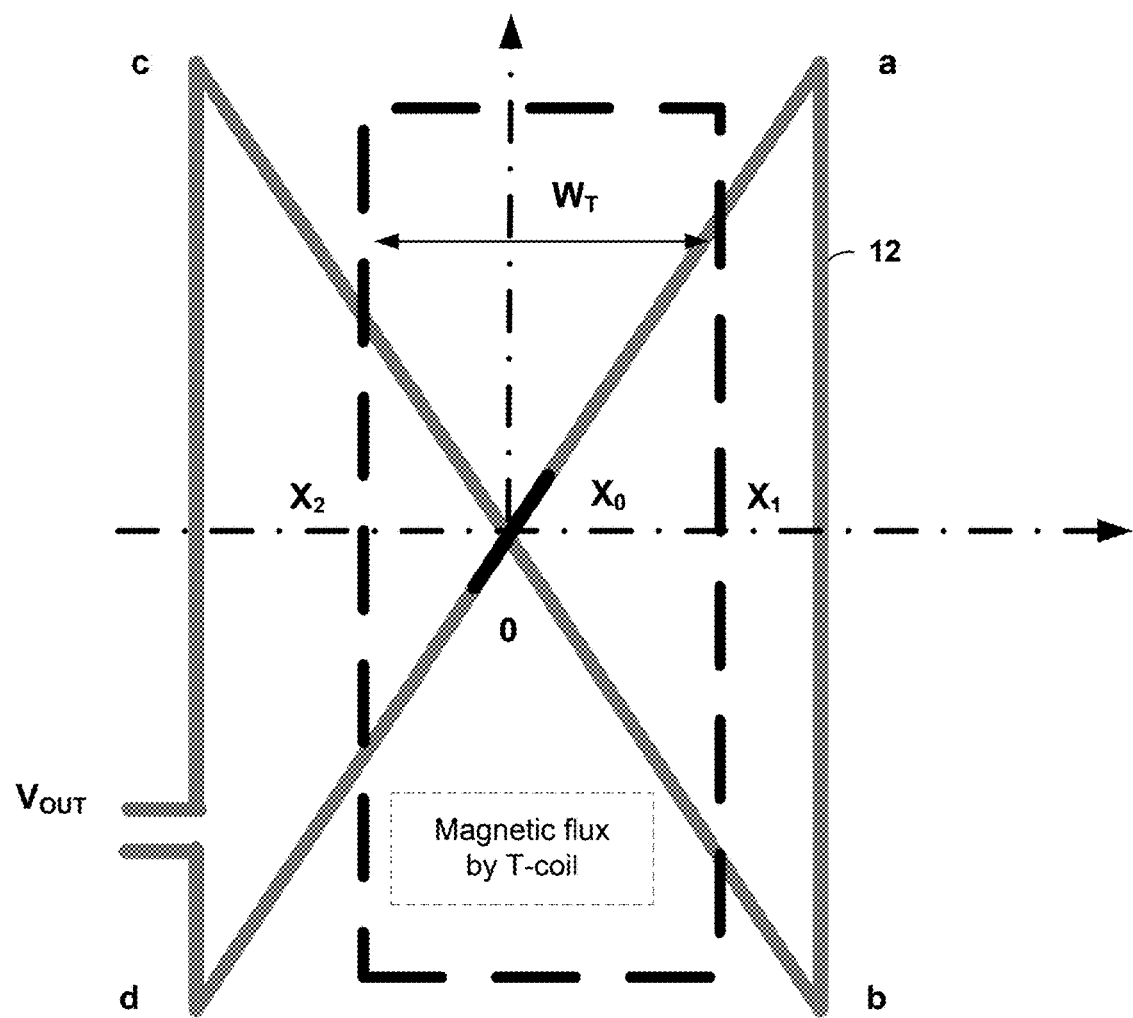
FIG. 10 is a conceptual diagram illustrating an example overlap area of one of the plurality of pick-off coils and a magnetic field generated by the target coil, in accordance with the techniques described herein.

FIG. 10 is a conceptual diagram illustrating an example overlap area of one of the plurality of pick-off coils and a magnetic field generated by the target coil, in accordance with the techniques described herein. In some examples, the output voltage of the $i^{th}$ pick-off coil (e.g., pick-off coil 12) with center (point "o") at $X_0{}^i$ is described in Equation 5.

$$V_{OUT}{}^i = \omega\sqrt{L_{TX}L_{RX}}\, k_{TX}{}^T Q_T k_{TX} 2 k_{*,T}{}^{RX} K_{RX} W_T (X_T - X_0^i) \tag{5}$$

According to Equation 5, $W_T = X_1 - X_2$ is the width of the magnetic field flux area and $X_T = (X_1 + X_2)/2$ is the "center" of the magnetic flux area shown in FIG. 10. In Equation 5, the scale factor is defined as $k_T{}^{RX} = 2 k_{*,T}{}^{RX} K_{RX} W_T (X_T - X_o)$, where $k_{*,T}{}^{RX}$=constant. Additionally, in Equation 5, the metal traces of (oa) & (od) are defined by the linear equation $Y = K_{RX}(X - X_o)$, where $X_o$ is coordinate of trace cross section point (o), and $K_{RX}$ is trace slope.

Figure 11:
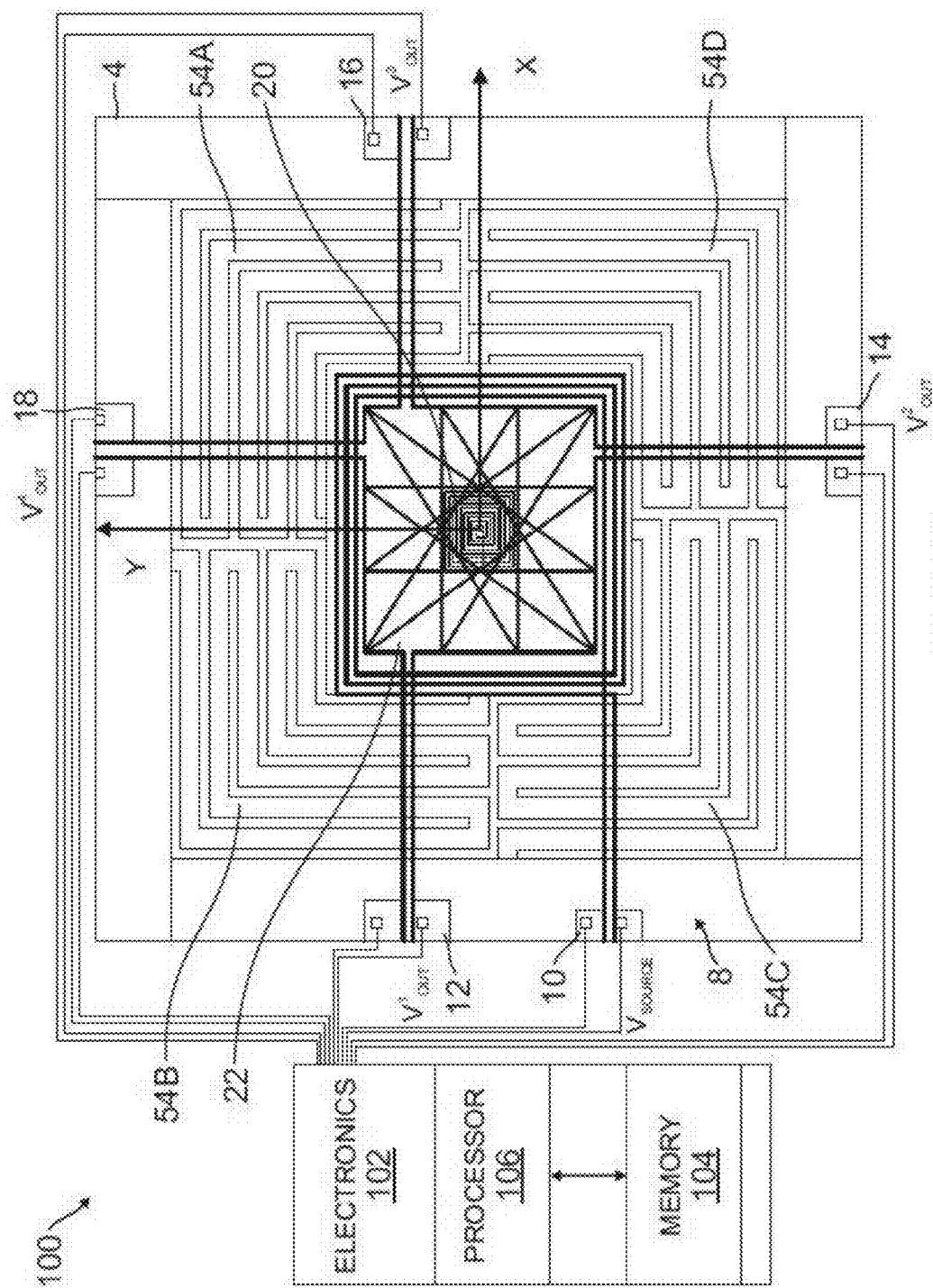
FIG. 11 is a conceptual diagram illustrating an example system, in accordance with the techniques described herein.

FIG. 11 is a conceptual diagram illustrating an example system 100, in accordance with the techniques described herein. FIG. 11 is described with reference to FIGS. 1 and 2. In the example of FIG. 11, system 100 includes support wafer 4, source coil 10, pick-off coils 12, 14, 16, and 18 (pick-off coils 12-18), which may correspond to support wafer 4, source coil 10, and pick-off coils 12-18 as described in FIG. 1, respectively. In the example of FIG. 11, system 100 further includes target coil 20 and proof mass 22, which may correspond to target coil 20 and proof mass 22 as described in FIG. 2, respectively. In the example of FIG. 11, system 100 further includes proof mass flexures 54A-54D, which may correspond to proof mass flexures 54 as described in FIG. 3. Additionally, in the example of FIG. 11, system 100 includes electronics 102. Electronics may include processor(s) 106 and memory 104. In the example of FIG. 11, pick-off coils 12 and 16 are oriented along the X-direction and pick-off coils 14 and 18 are oriented along the Y-direction.

In some examples, the pads of source coil 10, pick-off coils 12-18, and target coil 20 may be connected to an interface of electronics 102 with cables. In some examples, the cables may be high-temperature cables. In some examples, processor 106 of electronics 102 may apply a source voltage at source coil 10 with the cables. In some examples, processor 106 of electronics 102 may receive an output voltage from each of pick-off coils 12-18 with the cables.

Memory 104 as well as other storage devices disclosed herein can each comprise any suitable arrangement of hardware, software, firmware, or any combination thereof, to perform the techniques attributed to the respective memory 104 herein. For example, memory 104 may include a magnetic non-voltage random-access memory (RAM), a magnetic hard-drive, or any other equivalent memory devices, as well as any combinations of such components. In some examples, memory 104 may store the instructions for performing the signal processing algorithm. In some examples, memory 104 may store the determined acceleration values.

Processor 106 as well as other processors disclosed herein can each comprise any suitable arrangement of hardware to perform the techniques attributed to the respective processor 106 herein. For example, processor 106 may each include any one or more microprocessors, digital signal processors (DSPs), application specific integrated circuits (ASICs), field programmable gate arrays (FPGAs), or any other equivalent integrated or discrete logic circuitry, as well as any combinations of such components.

Processor 106 receives data from accelerometer 1. In some examples, processor 106 may receive data from accelerometer 1 indicative of an amount of displacement of proof mass 22 of accelerometer 1. In these examples, processor 106 may receive data from accelerometer 1 indicative of an amount of acceleration of accelerometer 1.

In some examples, inductive pick-off 8 of accelerometer 1 may include signal source coil 10, target coil 20, and a plurality of pick-off coils 12-18 (e.g., two pairs of identical pick-off coils). In some examples, the first pick-off coil pair, pick-off coil 12 and pick-off coil 16 may be oriented along the X-axis with the coil centers (point "o") locating at coordinates $X_o^1$ and $X_o^3$. In some examples, the center of pick-off coils 12 and 16 may symmetrically stand on X-axis at $X_o^3 = -X_o^1 = X_o^*$. In some examples, the second pick-off coil pair, pick-off coils 14 and 18 may be oriented along the Y-axis with the coil centers (point "o") locating at coordinates $Y_o^2$ and $Y_o^4$. In some examples, the center of pick-off coils 14 and 18 may symmetrically stand on Y-axis at $Y_o^4 = -Y_o^2 = Y_o^*$.

To simplify notation, $V_{OUT}^0 \equiv \omega \sqrt{L_{TX} L_{RX}} k_{TX}^T Q_T I_{TX} 2 k_{*,T}^{RX} K_{RX} W_T$. Output voltages, $V_{OUT}^i$, of the coils oriented along the X-axis, i={1, 3}, are $V_{OUT}^i = V_{OUT}^0 (X_T - X_0^i)$. Output voltages, $V_{OUT}^i$, of the coils oriented along the Y-axis, i={2, 4}, are $V_{OUT}^i = V_{OUT}^0 (Y_T - Y_0^i)$.

Figure 12:
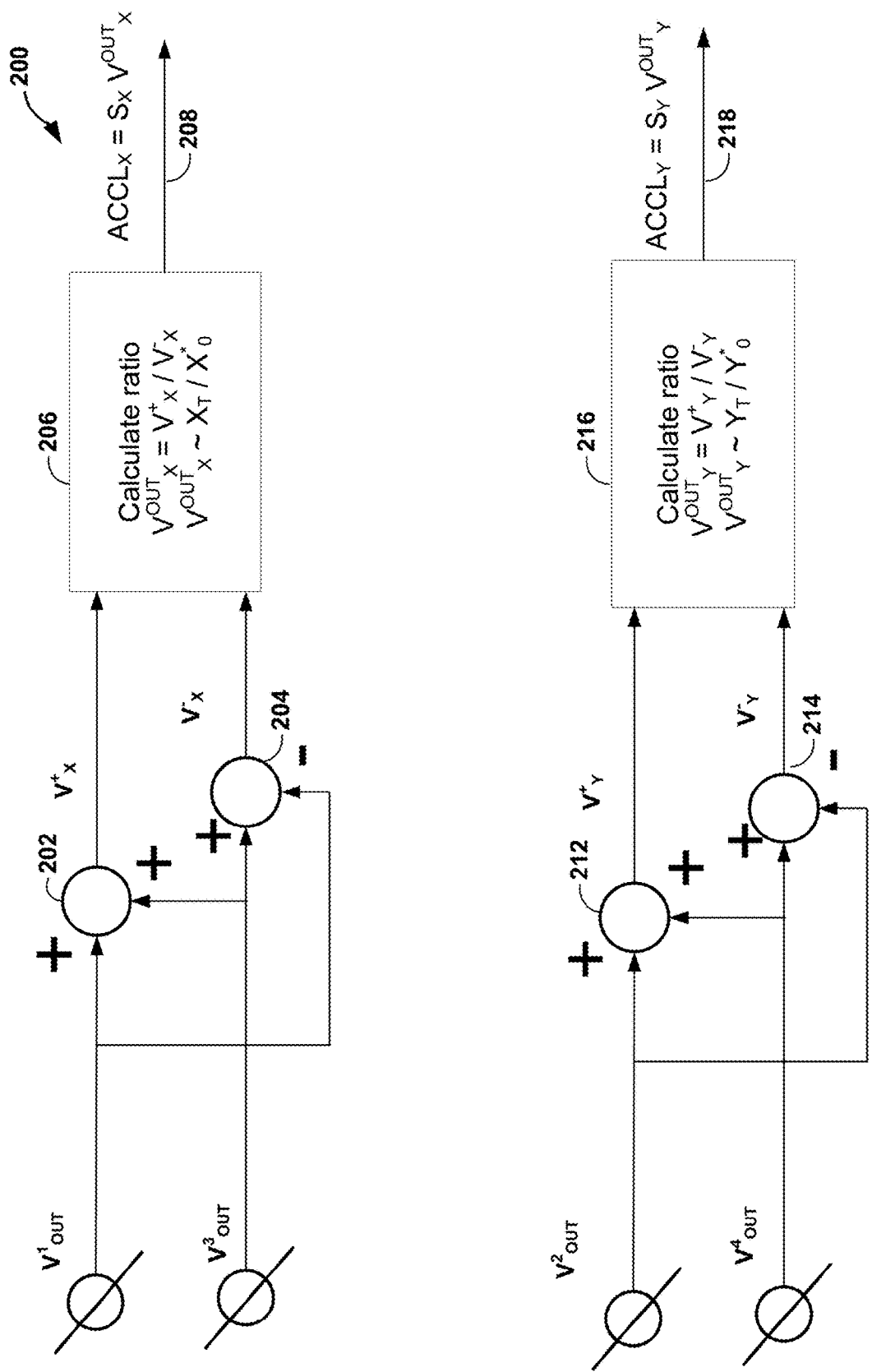
FIG. 12 is a block diagram illustrating example operations for determining an acceleration value from outputs received from the plurality of pick-off coils, in accordance with the technique described herein.

FIG. 12 is a block diagram illustrating example operations for determining an acceleration value from outputs received from the plurality of pick-off coils, in accordance with the technique described herein. FIG. 12 is described with reference to FIG. 11. In the example of FIG. 12, electronics 102 may receive the output voltages from pick-off coils 12-18. In some examples, processor 106 may use signal processing algorithm 200 stored in memory 104 to determine an acceleration value of a proof mass in the X-direction and/or the Y-direction.

For example, processor 106 may add the voltage outputs $V^1_{OUT}$ and $V^3_{OUT}$ to determine $V_x^+ = 2 V_{OUT}^0 X_T$ (202). Processor 106 may also subtract the voltage outputs $V^1_{OUT}$ and $V^3_{OUT}$ to determine $V_x^- = 2 V_{OUT}^0 X_0^+$ (204). Thus, processor 106 may determine the signal dividing result is $$V_x^{out} = \frac{X_T}{X_o^*}, \quad (206)$$

which yields $$ACCL_x = S_x\left(\frac{X_T}{X_o^*}\right), \quad (208)$$

where $ACCL_x$ is measured acceleration in the X-direction, and $S_x$ is the scale factor.

Similarly, to process the Y-component, processor 106 may add the voltage outputs $V^2_{OUT}$ and $V^4_{OUT}$ to determine $V_y^+ = 2 V_{OUT}^0 Y_T$ (212). Processor 106 may also subtract the voltage outputs $V^2_{OUT}$ and $V^4_{OUT}$ to determine $V_y^- = 2 V_{OUT}^0 Y_o^*$ (214). Thus, processor 106 may determine the signal dividing result is $$V_y^{out} = \frac{Y_T}{Y_o^*}, \quad (216)$$

which yields $$ACCL_y = S_y\left(\frac{Y_T}{Y_o^*}\right), \quad (218)$$

where $ACCL_y$ is measured acceleration in the Y-direction, and $S_y$ is the scale factor.

Figure 13:
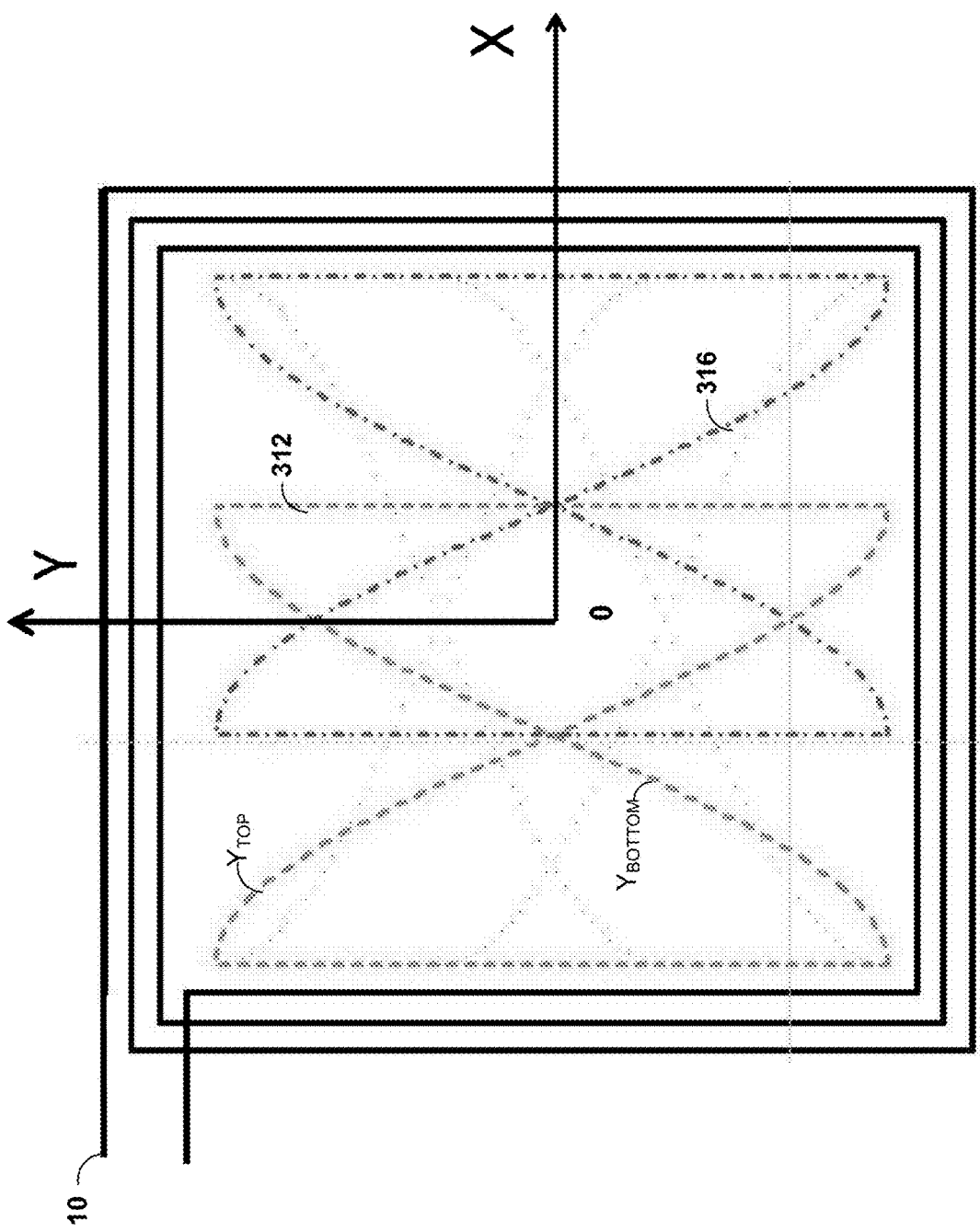
FIGS. 13 and 14 are conceptual diagrams illustrating example top views of pick-off coils shaped based on a sine (SIN) trigonometric function, in accordance with the technique described herein.
Figure 14:
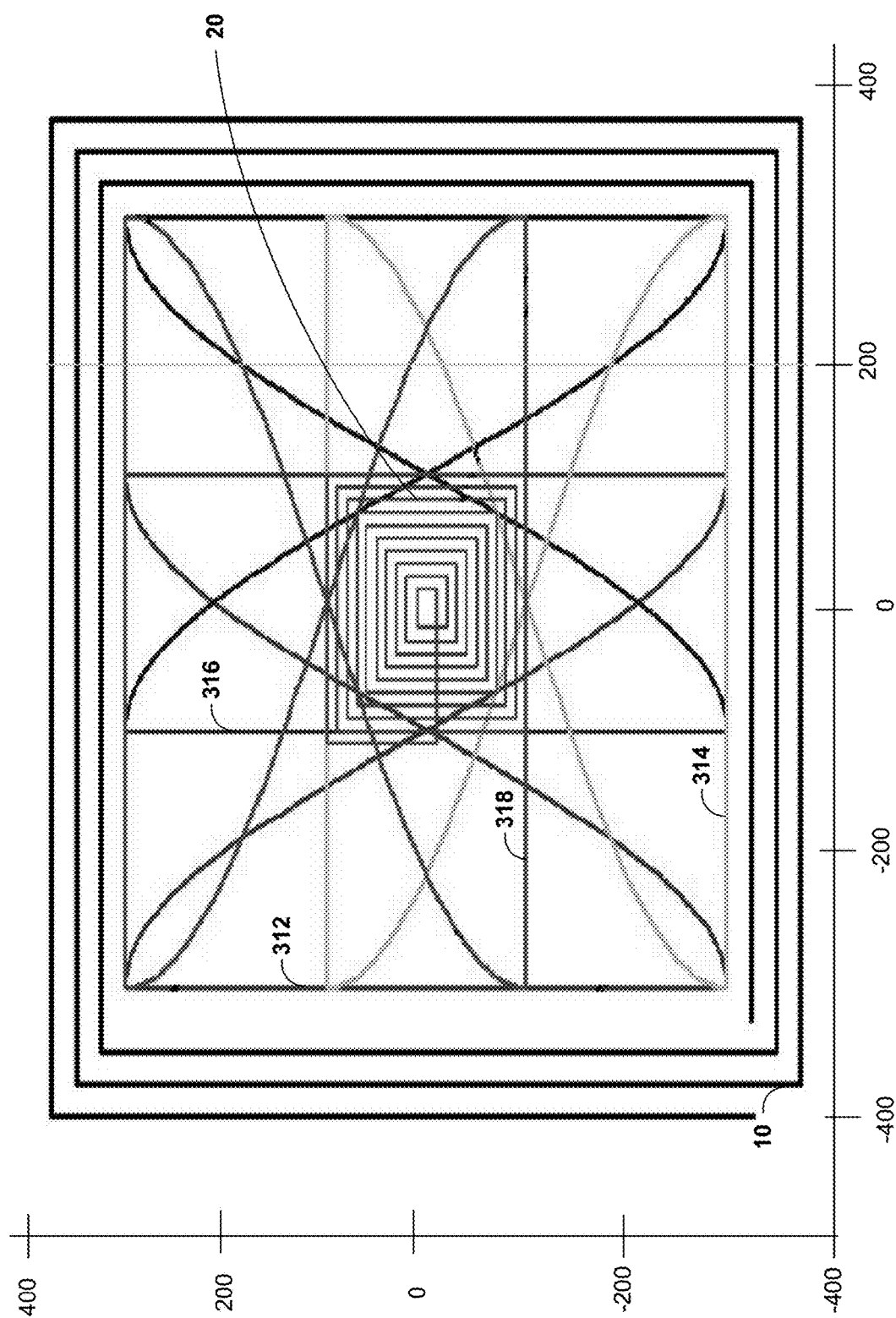

FIGS. 13 and 14 are conceptual diagrams illustrating example top views of pick-off coils shaped based on a SIN trigonometric function, in accordance with the technique described herein. In some examples, if a pick-off coil windings is shaped based on a SIN trigonometric function, the coil traces may be described as $Y^{Top} = A \sin(k(X - X_o^i))$ and $Y^{Bottom} = -A \sin(k(X - X_o^i))$, where $k = 2\pi/\lambda$ is coil shape wave vector, $L = \lambda/2$ is coil length, $W = 2A$ is coil width.

In the example of FIG. 13, pick-off coils 312 and 316, which may be similar to pick-off coils 12 and 16, are shaped based on a trigonometric SIN-function. In some examples, pick-off coils 312 and 316 may be aligned with the X-axis and offset by $X^1_o = -\lambda/8$ and $X^3_o = \lambda/8$.

In the example of FIG. 14, two pairs of pick-off coils 312 and 316, and 314 and 318, which may be similar to pick-off coils 12 and 16, and 14 and 18, are each shaped based on a trigonometric SIN-function and aligned with the X axis and the Y axis, respectively. In this example, the output voltages of pick-off coils 312 and 316 may be i={1,3} output is $V_{OUT}^i = V_{OUT}^0 \sin(k(X_T - X_0^i))$, where $k = 2\pi/\lambda$, $X^3_o = -X^1_o = \lambda/8$. Additionally, in this example, the output voltages of pick-off coils 314 and 318 may be i={2,4} output is $V_{RX}^i = V_{RX}^0 \sin(k(Y_T - Y_o^i))$, where $k = 2\pi/\lambda$. $Y^2_o = Y^2_o = \lambda/8$.

In other words, the output voltages for pick-off coils 312 and 316 may be $$V_{OUT}^{\{1,3\}} = V_{OUT}^0 \left(kX_T \pm \frac{\pi}{4}\right).$$

Similarly, the output voltage for pick-off coils 314 and 318 may be $$V_{OUT}^{\{2,4\}} = V_{OUT}^0 \sin\left(kY_T \pm \frac{\pi}{4}\right).$$

Figure 15:
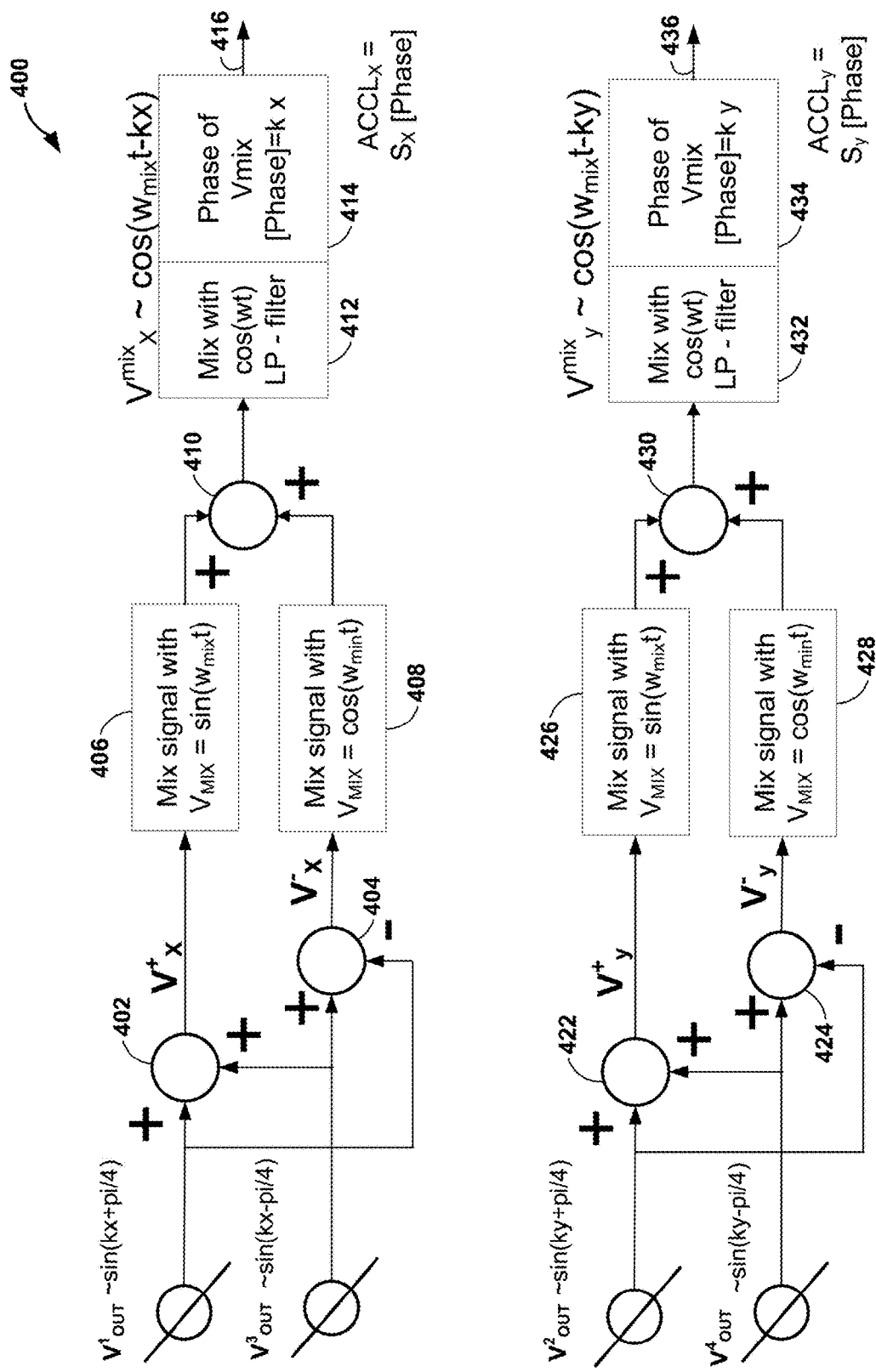
FIG. 15 is a block diagram illustrating another example operations for determining an acceleration value from outputs received from a plurality of pick-off coils shaped based on a SIN trigonometric function, in accordance with the technique described herein.

FIG. 15 is a block diagram illustrating another example operations for determining an acceleration value from outputs received from a plurality of pick-off coils shaped based on a SIN trigonometric function, in accordance with the technique described herein. FIG. 15 is described with reference to FIGS. 11 and 14. In the example of FIG. 15, electronics 102 may receive the output voltages from pick-off coils 312-318. In some examples, processor 106 may use signal processing algorithm 400 stored in memory 104 to determine an acceleration value of a proof mass in the X-direction and/or the Y-direction.

For example, processor 106 may add the voltage outputs $V^1_{OUT}$ and $V^3_{OUT}$ to determine $$V_x^+ = V_{OUT}^0 \frac{\sin(kX_T)}{\sqrt{2}}. \quad (402)$$

Processor 106 may also subtract the voltage outputs $V^1_{OUT}$ and $V^3_{OUT}$ to determine $$V_x^- = V_{OUT}^0 \frac{\cos(kX_T)}{\sqrt{2}}. \quad (404)$$

Processor 106 may mix the signal $$V_x^+ \text{ with } V_{x,1}^{mix} = \frac{V_{OUT}^0}{\sqrt{2}} \cos(\omega t)\sin(\omega_{mix}t)\sin(kX_T) \quad (406)$$

and may mix the signal $V_x^-$ with $$V_{x,3}^{mix} = \frac{V_{OUT}^0}{\sqrt{2}} \cos(\omega t)\cos(\omega_{mix}t)\cos(kX_T). \quad (408)$$

Processor 106 may add $V^{mix}_{X,1}$ and $V^{mix}_{X,3}$ signals to determine $$V_{x,*}^{mix} = V_{x,1}^{mix} + V_{x,3}^{mix} = \frac{V_{OUT}^0}{\sqrt{2}} \cos(\omega t)\cos(\omega_{mix}t - kX_T). \quad (410)$$

Mixing $V^{mix}_{x,*}$ with signal $V_{mix}=\cos(\omega t)$ yields Equations 6 which is reduced to Equation 7.

$$V_x^{mix} = \frac{V_{OUT}^0}{\sqrt{2}} \cos(\omega t)\cos(\omega t)\cos(\omega_{mix}t - kX_T) \quad (6)$$

$$V_x^{mix} = \frac{V_{OUT}^0}{2\sqrt{2}} (1 + \cos(2\omega t))\cos(\omega_{mix}t - kX_T) \quad (7)$$

Hence, low pass filter output is $$LP{:}V_x^{mix} = \frac{V_{OUT}^0}{2\sqrt{2}} \cos(\omega_{mix}t - kX_T). \quad (412)$$

Phase of LP: $V_x^{mix}$ signal is [Phase]=$2\pi$ ($X_T/\lambda$) (414), which yields:

$$ACCL_x = 2\pi S_x\left(\frac{X_T}{\lambda}\right), \quad (416)$$

where $ACCL_x$ is measured acceleration in X-direction, and $S_x$ is the scale factor.

Similarly, to process the Y-component of the acceleration value, processor 106 may add the voltage outputs $V^2_{OUT}$ and $V^4_{OUT}$ to determine $$V_y^+ = V_{OUT}^0 \frac{\sin(kY_T)}{\sqrt{2}}. \quad (422)$$

Processor 106 may also subtract the voltage outputs $V^2_{OUT}$ and $V^4_{OUT}$ to determine $$V_y^- = V_{OUT}^0 \frac{\cos(kY_T)}{\sqrt{2}}. \quad (424)$$

Processor 106 may mix the signal $V_y^+$ with $$V_{y,2}^{mix} = \frac{V_{OUT}^0}{\sqrt{2}} \cos(\omega t)\sin(\omega_{mix}t)\sin(kY_T) \quad (406)$$

and may mix the signal $$V_y^- \text{ with } V_{y,4}^{mix} = \frac{V_{OUT}^0}{\sqrt{2}} \cos(\omega t)\cos(\omega_{mix}t)\cos(kY_T). \quad (428)$$

Processor 106 may add $V^{mix}_{y,2}$ and $V^{mix}_{y,4}$ signals to determine $$V_{y,*}^{mix} = V_{y,2}^{mix} + V_{y,4}^{mix} = \frac{V_{OUT}^0}{\sqrt{2}} \cos(\omega t)\cos(\omega_{mix}t - kY_T). \quad (430)$$

Mixing $V^{mix}_{y,*}$ with signal $V_{mix}=\cos(\omega t)$ yields Equations 8 and 9.

$$V_y^{mix} = \frac{V_{OUT}^0}{\sqrt{2}} \cos(\omega t)\cos(\omega t)\cos(\omega_{mix}t - kY_T) \quad (8)$$

$$V_y^{mix} = \frac{V_{OUT}^0}{2\sqrt{2}} (1 + \cos(2\omega t))\cos(\omega_{mix}t - kY_T) \quad (9)$$

Hence, low pass filter output is LP:

$$V_y^{mix} = \frac{V_{OUT}^0}{2\sqrt{2}} \cos(\omega_{mix}t - kY_T). \quad (432)$$

Phase of LP: $V_y^{mix}$ signal is [Phase]=$2\pi$ ($Y_T/\lambda$) (434), which yields:

$$ACCL_y = 2\pi S_y\left(\frac{Y_T}{\lambda}\right), \quad (436)$$

where $ACCL_y$ is measured acceleration in Y-direction, and $S_y$ is the scale factor.

Figure 16:
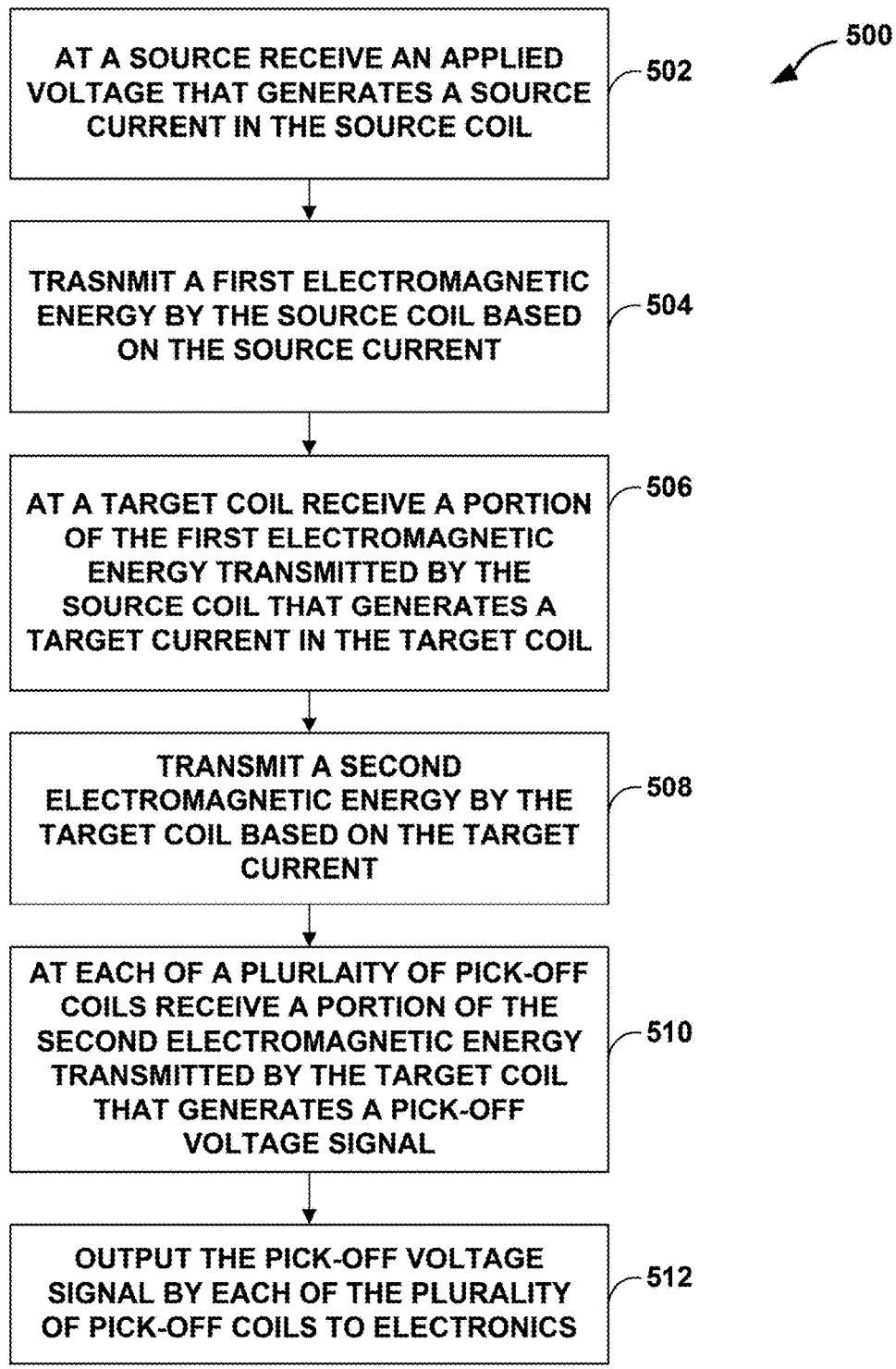
FIG. 16 is a flow chart illustrating a technique for operating an accelerometer of FIG. 1, in accordance with the technique described herein.

FIG. 16 is a flow chart illustrating an technique for operating an accelerometer of FIG. 1, in accordance with the technique described herein. FIG. 16 is described with reference to FIGS. 1 and 11.

In the example of FIG. 16, source coil 10 may receive an applied voltage that generates a source current in source coil 10 (502). In the example of FIG. 16, source coil 10 may transmit a first electromagnetic energy based on the source current (504). In the example of FIG. 16, target coil 20 on proof mass 22 may receive a portion of the first electromagnetic energy transmitted by source coil 10 that generates a target current in target coil 20 (506). In the example of FIG. 16, target coil 20 may transmit a second electromagnetic energy based on the target current (508). In the example of FIG. 16, each pick-off coil of a plurality of pick-off coils 12-18 may receive a portion of the second electromagnetic energy transmitted by the target coil that generates a pick-off voltage signal (510). In the example of FIG. 16, each pick-off coil of the plurality of pick-off coils 12-18 may output the pick-off voltage signal to electronics 102 (512), and the plurality of pick-off voltage signals are indicative of an amount of displacement of proof mass 22.

FIGS. 17A-17D are conceptual diagrams illustrating example operations for manufacturing an accelerometer, in accordance with the technique described herein. FIGS. 17A-17D separately illustrate various intermediate steps in the fabrication process of a portion of an accelerometer die. FIGS. 17A-17D are described with reference to FIG. 1.

In some examples, accelerometer 1 may be fabricated by processing masks using thin film metal/dielectric sputtering, DRIE, and wafer bonding steps. In some examples, raw wafers used for device fabrication are tree double polished wafers made of one material. For example, wafer material may be one of high temperature materials such as either undoped semiconductors (undoped single crystal Si, undoped GaAs, SiC, AlN, GaN, or any other suitable undoped semiconductor) or oxide crystals/dielectrics such as fused Quartz, Sapphire, Alumina ceramics, or any other suitable crystal/dielectric.

Figure 17A:
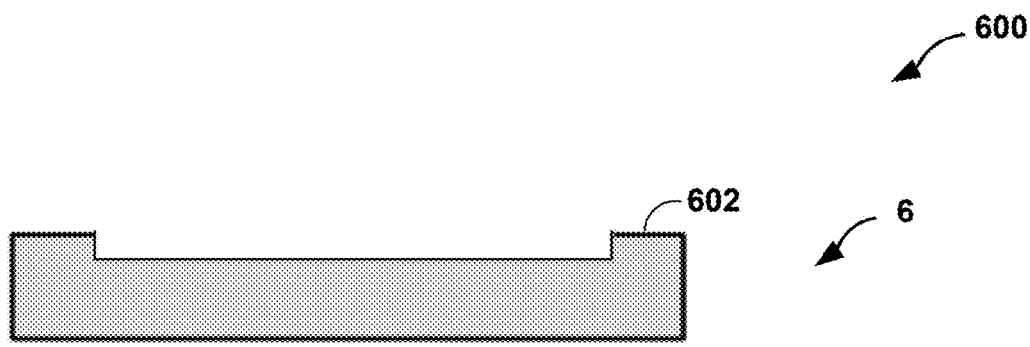
FIGS. 17A-17D are conceptual diagrams illustrating example operations for manufacturing an accelerometer, in accordance with the technique described herein.

In some examples, the accelerometer die may be fabricated in more or less of the following steps of method 600. In the example of FIG. 17A, with a first mask, a deep reactive-ion etch (DRIE) may be used to create a mesa on bottom wafer 6 (602). In some examples, bottom wafer 6 may also be used as top wafer 2.

Figure 17B:
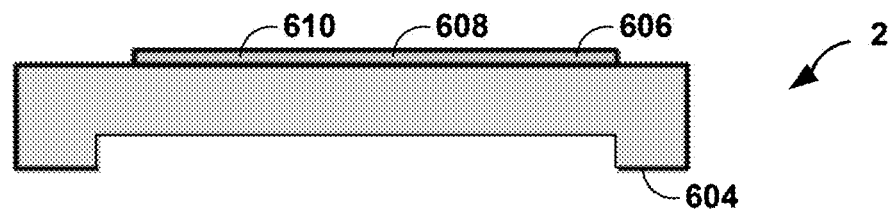

In the example of FIG. 17B, with a second mask, a DRIE may also be used to create a mesa on top wafer 2 (604). In some examples, a first metal may be sputtered to create a source coil on the outer side of top wafer 2 (606). In some examples, dielectric ribbons may be sputtered on top wafer 2 to electrically isolate the overlapping traces of the first metal. In some examples, a second metal may be sputtered to create inductive pick-off coils on the outer side of top wafer 2 (608). In other examples, the second metal may be sputtered to create inductive pick-off coils on the outer side of bottom wafer 6. In some examples, dielectric ribbons may be sputtered on top wafer 2 to electrically isolate the first metal and the second metal, and the overlapping traces of the second metal. Additionally, in some examples, a third metal may be sputtered to create inductive pick-off coils on the outer side of top wafer 2 (610). In other examples, the third metal may be sputtered to create inductive pick-off coils on the outer side of bottom wafer 6. In some examples, dielectric ribbons may be sputtered on top wafer 2 to electrically isolate the second metal and the third metal, and the overlapping traces of the third metal.

Figure 17C:
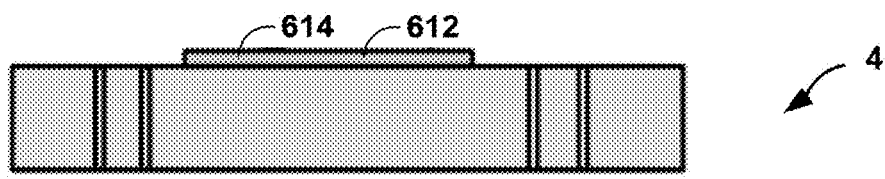

In the example of FIG. 17C, a fourth metal may be sputtered to create a target coil on the outer side of support wafer 4 (612). In some examples, dielectric ribbons may be sputtered on support wafer 4 to isolate the overlapping traces of the fourth metal. In some examples, a fifth metal may be sputtered on the outer side of support wafer 4 to create a capacitor (614).

Figure 17D:
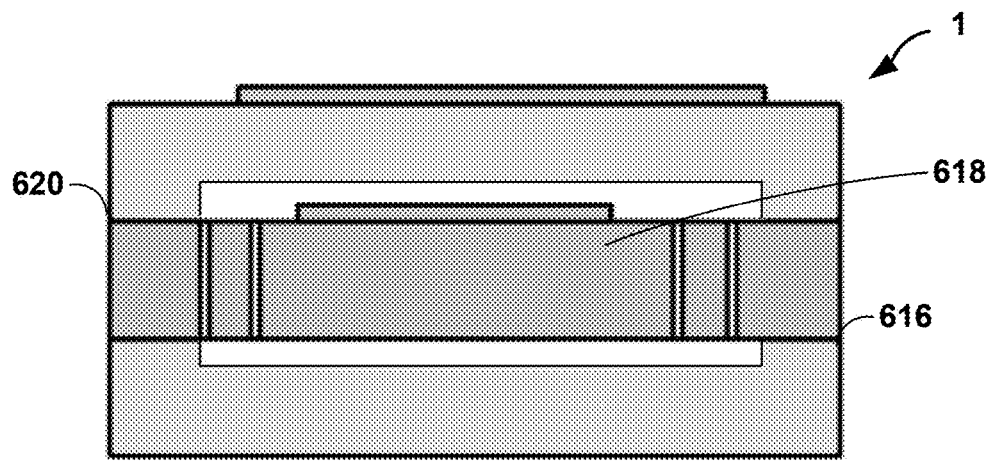

In the example of FIG. 17D, support wafer 4 may be bonded to bottom wafer 6 (616). In some examples, a DRIE may be used to create the proof mass and the proof mass flexures that flexibly support the proof mass (618). In some examples, support wafer 4 and bottom wafer 6 may be bonded to top wafer 2 (620). In some examples, after bonding support wafer 4 and bottom wafer 6 to top wafer 2, the wafer assembly may be diced to form accelerometer 1.

In summary, the systems, devices, and techniques described herein provide several unique characteristics listed in no particular order and degree of importance. First, the inductive pick-off interface utilizes near field resonant inductive coupling mechanism. Second, the accelerometer interface operates at MHz frequency range: excitation signal wavelength is in several orders of magnitude greater that accelerometer size. Third, the design for the coil winding of each pick-off coil and the signal processing algorithm determination of proof mass displacement. Fourth, each of the plurality of pick-off coils have congruent shapes. Fifth, the symmetrical location of the substantially identical pick-off coils defines a reference distance. Sixth, the displacement of the proof mass is measured with respect to the reference distance. Seventh, the signal processing algorithm combines output voltage signals of four pick-off coils to determine the acceleration value of proof mass displacement by reference distance ratio. Eighth, the accelerometer signal processing output is immune to pick-off coil amplitude variation. Ninth, the inductive pick-off interface allows the sensor output to be immune to in-plane rotation, out of plane displacement, and tilting of the proof mass. Tenth, the accelerometer suspension beam design combines set of specifically shaped beams supporting proof mass in-plane motion. Eleventh, the method of proof mass encapsulation and packaging allows for no metal traces connecting proof mass and device output pads, and all of the device pads locate on one side (outer side) of device package.

Unless stated to the contrary, terms such as first, second, third, or any other similar terms are used herein to differentiate components from one another. Unless stated to the contrary, terms such as first, second, third, or any other similar terms should not be assumed to establish any ordinal, sequential, or numerical relationship between the differentiated components.

In one or more examples, some of the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors (e.g., "processing devices"), such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and/or "processing device," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be provided by a collection of interoperative hardware units, including one or more processors as described above, in conjunction with suitable software and/or firmware.

Various examples of the disclosure have been described. These and other examples are within the scope of the following claims.

The invention claimed is:

1. An accelerometer comprising:
a support wafer defining a plane and comprising a proof mass, wherein the proof mass is configured to move in the plane defined by the support wafer;
a bottom wafer, wherein a first side of the bottom wafer is positioned over a first side of the support wafer;
a top wafer, wherein a first side of the top wafer is positioned over a second side of the support wafer; and
an inductive pick-off, wherein the inductive pick-off comprises a near field resonant inductive coupling mechanism and is configured to output a signal to electronics, and wherein the signal is indicative of an amount of displacement of the proof mass,
wherein the inductive pick-off comprises:
a source coil;
a target coil; and
a plurality of pick-off coils, wherein each pick-off coil of the plurality of pick-off coils comprises a respective coil winding that includes two congruent shapes, wherein the two congruent shapes comprise at least one of congruent triangles or congruent shapes based on a SIN trigonometric function.

2. The accelerometer of claim 1, wherein the inductive pick-off is further configured to:

receive, by the source coil, an applied voltage to generate a source current in the source coil,
transmit, by the source coil, a first electromagnetic energy based on the source current,
receive, by the target coil positioned on the proof mass, a portion of the first electromagnetic energy to generate a target current in the target coil,
transmit, by the target coil, a second electromagnetic energy based on the target current,
receive, by each of a plurality of pick-off coils, a portion of the transmitted second electromagnetic energy to generate a pick-off voltage signal, and
output, by each of the plurality of pick-off coils, the pick-off voltage signal to the electronics, wherein the plurality of pick-off voltage signals are indicative of the amount of displacement of the proof mass parallel to a plane defined by the proof mass.

3. The accelerometer of claim 1, wherein:
the source coil is positioned on the second side of the top wafer;
the target coil is positioned on a first side of the proof mass; and
the plurality of pick-off coils are positioned on the second side of the top wafer.

4. The accelerometer of claim 3, wherein the source coil is configured to:
receive an applied voltage to generate a source current, and
transmit an electromagnetic energy to a target coil to induce a target current in the target coil.

5. The accelerometer of claim 3, wherein the target coil comprises one of an LC-resonator or an inductive coil, wherein the target coil is configured to:
receive a first electromagnetic energy transmitted from the source coil to generate a target current, and
transmit a second electromagnetic energy.

6. The accelerometer of claim 5, wherein the target coil is located substantially near a center of the proof mass with tolerance of less than 1% of coil metal trace width, wherein the source coil defines an aperture, and wherein the target coil is located below the aperture of the source coil.

7. The accelerometer of claim 3, wherein each of the plurality of pick-off coils is configured to:
receive an electromagnetic energy to generate a pick-off voltage signal, and
output the pick-off voltage signal to the electronics, wherein the plurality of pick-off voltage signals from the plurality of pick-off coils are indicative of the amount of displacement of the proof mass.

8. The accelerometer of claim 3, wherein each of the plurality of pick-off coils is configured to generate a homogeneous electromagnetic field inside a coil winding of each of the plurality of pick-off coils, and wherein a coupling factor for each coil winding of the plurality of pick-off coils with the source coil is substantially close to zero.

9. The accelerometer of claim 1, further comprising a plurality of proof mass flexures to flexibly connect the proof mass to a support section of the support wafer, wherein the plurality of proof mass flexures are flexible in the plane defined by the support wafer and stiff out of the plane defined by the support wafer.

10. The accelerometer of claim 1, wherein the support wafer is bonded to the top wafer and the bottom wafer to form a microelectromechanical system (MEMS) accelerometer die with a monolithic structure.

11. The accelerometer of claim 10, wherein the monolithic structure comprises a material selected from a group consisting of either i-type semiconductors or dielectric materials:
   undoped silicon (Si),
   undoped gallium arsenide (GaAs),
   undoped silicon carbide (SiC),
   undoped aluminum nitride (AlN),
   undoped gallium nitride (GaN),
   sapphire,
   fused quartz, and
   alumina ceramics.

12. The accelerometer of claim 1, wherein the inductive pick-off is configured to operate in a megahertz (MHz) frequency range and in ambient temperatures up to and around 1000 degrees Celsius.

13. An inductive pick-off system for an accelerometer, the inductive pick-off system comprising:
   a source coil, wherein the source coil is configured to:
      receive an applied voltage to generate a source current, and
      transmit a first electromagnetic energy based on the source current;
   a target coil positioned on a proof mass of the accelerometer, wherein the target coil is configured to:
      receive a portion of the first electromagnetic energy to generate a target current in the target coil, and
      transmit a second electromagnetic energy based on the target current; and
   a plurality of pick-off coils, wherein each of the plurality of pick-off coils is configured to:
   receive a portion of the second electromagnetic energy to generate a pick-off voltage signal, and
      output the pick-off voltage signal to electronics, wherein the plurality of pick-off voltage signals are indicative of an amount of displacement of the proof mass of the accelerometer,
   wherein a coil winding of each of the plurality of pick-off coils comprises two congruent shapes, wherein the two congruent shapes comprises at least one of two congruent triangles or two congruent shapes based on a SIN trigonometric function.

14. The inductive pick-off system of claim 13, wherein each of the plurality of pick-off coils is configured to generate a homogeneous electromagnetic field inside of the coil winding of each of the plurality of pick-off coils, and wherein a coupling factor for each coil winding of the plurality of pick-off coils with the source coil is substantially close to zero.

15. The inductive pick-off system of claim 13, wherein the source coil defines an aperture, wherein the target coil is positioned below the aperture of the source coil, and wherein the plurality of pick-off voltage signals are indicative of the amount of displacement of the proof mass comprises an indication of an amount of displacement of the proof mass parallel to a plane defined by the proof mass.

16. The inductive pick-off system of claim 13, wherein the inductive pick-off system is configured to operate in a megahertz (MHz) frequency range and in ambient temperatures up to and around 1000 degrees Celsius.

17. A method comprising:
   receiving, by a source coil, an applied voltage to generate a source current in the source coil;
   transmitting, by the source coil, a first electromagnetic energy based on the source current;
   receiving, by a target coil positioned on a proof mass, a portion of the first electromagnetic energy to generate a target current in the target coil;
   transmitting, by the target coil, a second electromagnetic energy based on the target current;
   receiving, by each of a plurality of pick-off coils, a portion of the second electromagnetic energy to generate a pick-off voltage signal, wherein each pick-off coil of the plurality of pick-off coils comprises a respective coil winding that includes two congruent shapes, wherein the two congruent shapes comprise at least one of congruent triangles or congruent shapes based on a SIN trigonometric function; and
   outputting, by each of the plurality of pick-off coils, the pick-off voltage signal to electronics, wherein a phase of the plurality of pick-off voltage signals are indicative of an amount of displacement of the proof mass.

* * * * *